(12) United States Patent
Singh et al.

(10) Patent No.: US 9,471,666 B2
(45) Date of Patent: Oct. 18, 2016

(54) SYSTEM AND METHOD FOR SUPPORTING NATURAL LANGUAGE QUERIES AND REQUESTS AGAINST A USER'S PERSONAL DATA CLOUD

(75) Inventors: Rajan Singh, San Jose, CA (US); Thierry Donneau-Golencer, Menlo Park, CA (US); Corey Hulen, Menlo Park, CA (US); William Scott Mark, San Mateo, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 649 days.

(21) Appl. No.: 13/353,237

(22) Filed: Jan. 18, 2012

(65) Prior Publication Data

US 2013/0185336 A1  Jul. 18, 2013
US 2014/0258339 A9  Sep. 11, 2014

Related U.S. Application Data

(63) Continuation-in-part of application No. 13/287,983, filed on Nov. 2, 2011.

(51) Int. Cl.
G06F 7/00 (2006.01)
G06F 17/00 (2006.01)
G06F 17/30 (2006.01)

(52) U.S. Cl.
CPC .............................. G06F 17/30654 (2013.01)

(58) Field of Classification Search
CPC ................. G06F 17/30654; G06F 17/30646; G06F 17/30073
USPC ........ 707/706, 769, 790, 794, 609, 737, 741
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,664,109 A | 9/1997 | Johnson |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Formukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

"Google Plus Users", Google+Ripples; Oct. 31, 2011; 3 pages.

*Primary Examiner* — Md. I Uddin
(74) *Attorney, Agent, or Firm* — Schwabe, Williamson & Wyatt, PC

(57) ABSTRACT

A machine-implemented method for supporting a natural language user request against a user's personal data cloud can include a machine receiving the natural language user request from the user, determining a semantic interpretation of the natural language user request, querying a semantically-indexed, integrated knowledge store based on the semantic interpretation, and responding to the natural language user request by displaying results of the querying, wherein the results correspond to an item within the user's personal data cloud.

34 Claims, 24 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,738,767 B1 | 5/2004 | Chung et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,036,128 B1 * | 4/2006 | Julia et al. .................... 719/317 |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,805,833 B2 * | 8/2014 | Nath et al. .................... 707/736 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0101169 A1 | 5/2003 | Bhatt et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2005/0114777 A1* | 5/2005 | Szeto .......................... 715/710 |
| 2005/0197954 A1 | 9/2005 | Maitland |
| 2006/0085436 A1 | 4/2006 | Dettinger |
| 2006/0089945 A1* | 4/2006 | Paval .......................... 707/102 |
| 2006/0245641 A1* | 11/2006 | Viola et al. ................... 382/155 |
| 2008/0094205 A1 | 4/2008 | Thorn |
| 2008/0249972 A1 | 10/2008 | Dillon |
| 2009/0063415 A1 | 3/2009 | Chatfield et al. |
| 2009/0070322 A1* | 3/2009 | Salvetti et al. ................... 707/5 |
| 2009/0100342 A1 | 4/2009 | Jakobson |
| 2009/0106224 A1* | 4/2009 | Roulland et al. ................. 707/5 |
| 2009/0177744 A1 | 7/2009 | Marlow et al. |
| 2009/0259670 A1 | 10/2009 | Inmon |
| 2010/0030715 A1* | 2/2010 | Eustice .................. G06Q 10/10 706/12 |
| 2011/0218958 A1 | 9/2011 | Warshavsky |
| 2011/0247051 A1 | 10/2011 | Bulumulla et al. |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0024924 A1 | 1/2013 | Brady et al. |
| 2013/0110842 A1* | 5/2013 | Donneau-Golencer et al. ............................. 707/741 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0046876 A1 | 2/2014 | Zhang |
| 2014/0359537 A1 | 12/2014 | Jakobson et al. |

\* cited by examiner

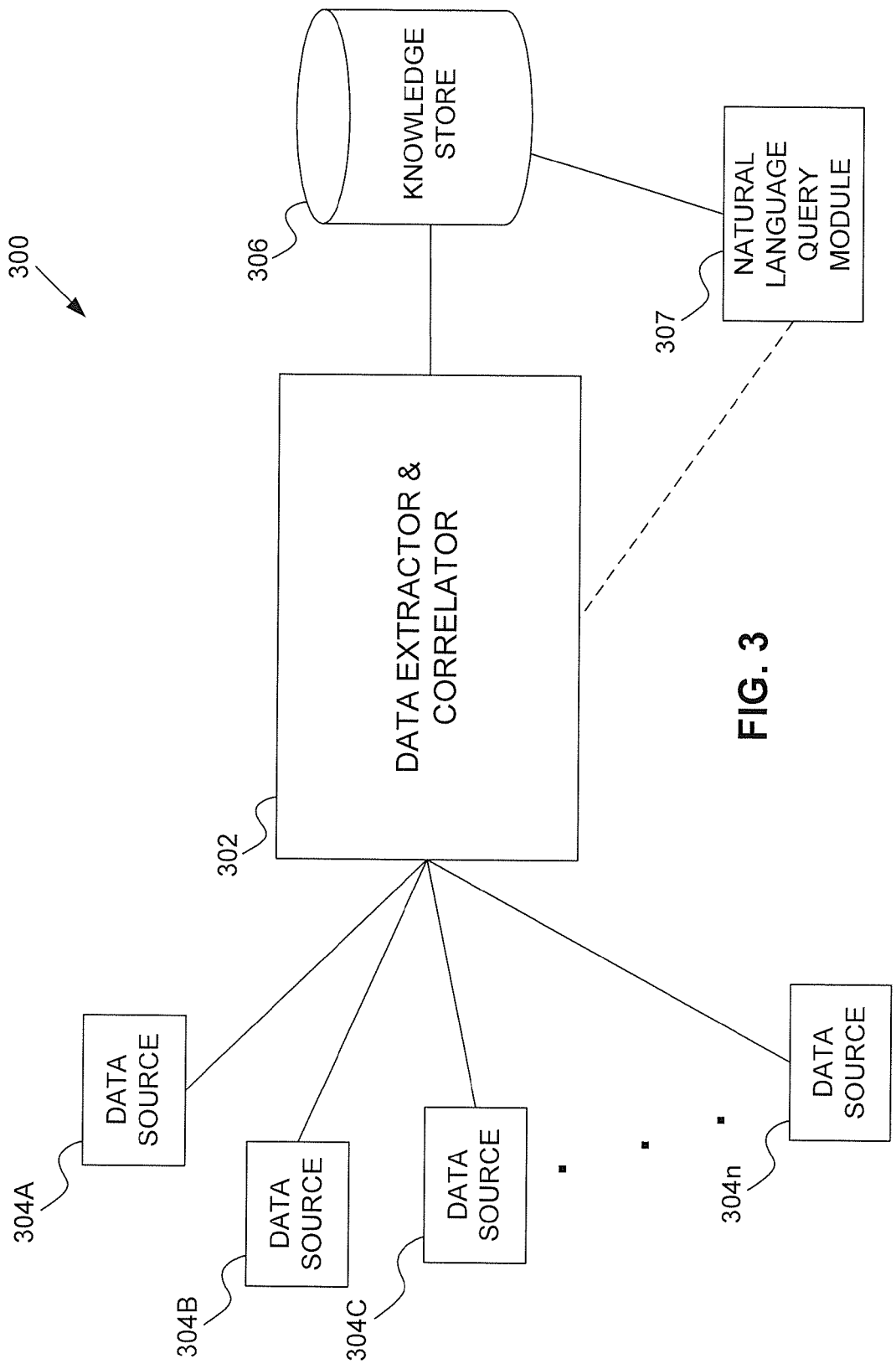

Ask fifo: Start typing or tap a suggestion below 402

Suggestions 404

| | all versions of documents about Nokia, Motorola financials |
| | recent documents from Gmail and Box |
| | Excel documents sent from finance team |
| | email from Jim K., James P. about next basketball game |
| | Did John reply to my last email? |
| | Who is Brett Bretterson? |
| | attendees of the last Nokia, Samsung telecon |
| | What's the status and open bugs for the Motorola account? |

Recent Queries 406

| | When is my next friend's birthday? |
| | recent links from Gmail sent by Jim or about 49ers |

FIG. 4

Meeting with Nokia @ 2PM — See next meeting with Motorola ▶

- Summary ▶
- Attendees ▶
- Agenda/Emails ▶
- Related Docs ▶
- CRM Details ▶
- Activity Stream ▶
- Latest News ▶
- Bugs ▶
- Cust Srvc Reqs ▶

Below items appear to contain discussion points:

| | | | |
|---|---|---|---|
| 📅 | SuperSpotlight | | 12-7-10 |
| ✉ | David Ladd | RE: CB Follow-up | 2-17-11 |
| ✉ | David Ladd | RE: Reference | 2-19-11 |
| ✉ | Norman Win... | RE: Presentation | 2-21-11 |
| SF | Build demo template | | 2-9-11 |
| SF | Create competitive | | 2-10-11 |

✉ Norman Winarsky    RE: Presentation    2-21-11

Hi Raj,

I reviewed your introductory presentation. [I would like to see more details about your compression performance. Can we discuss next time?] Looking forward to it.

1102

1104

Norman

Email mis-filed
(help make us smarter)
[Motorola ▼]  [Tag]

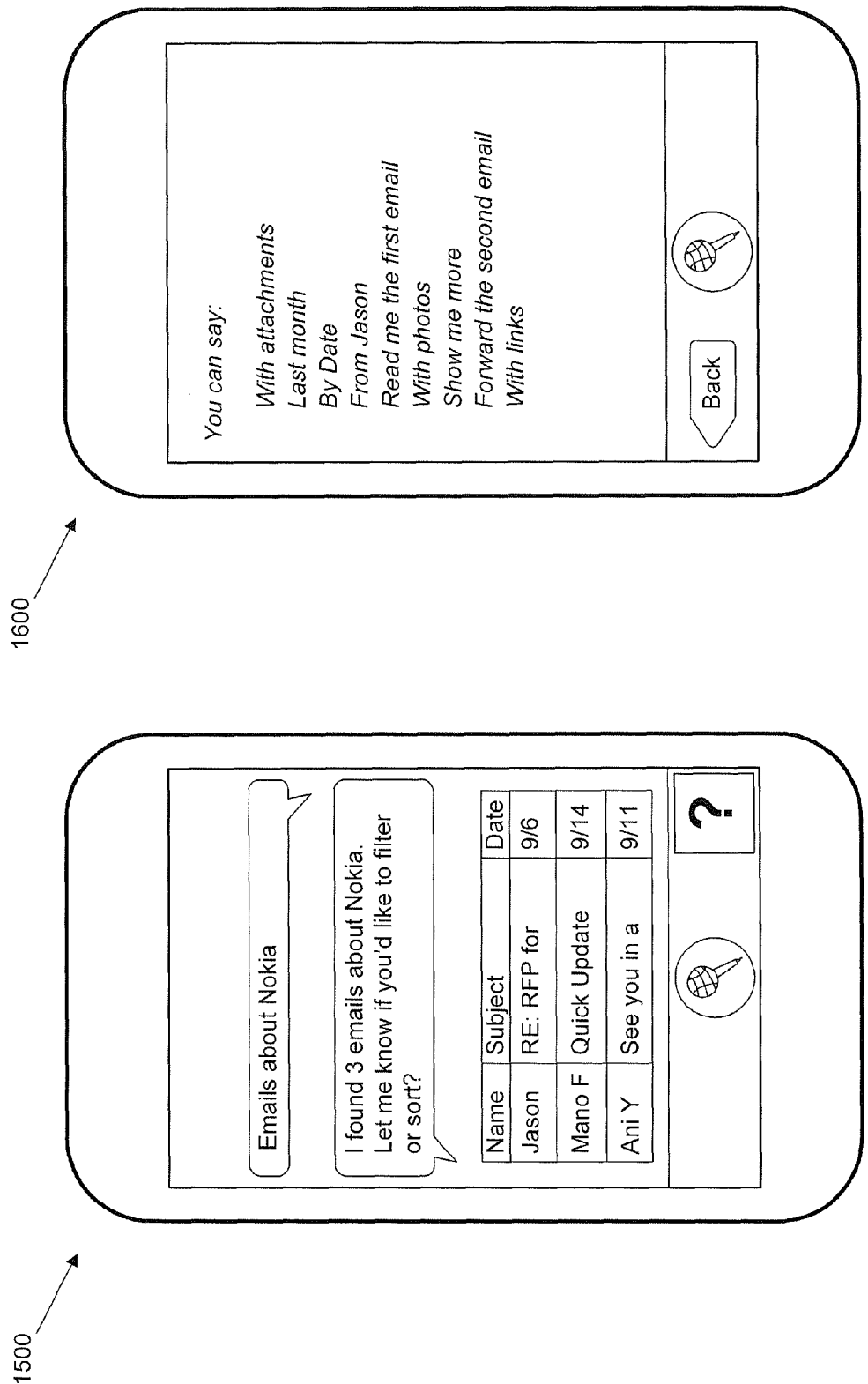

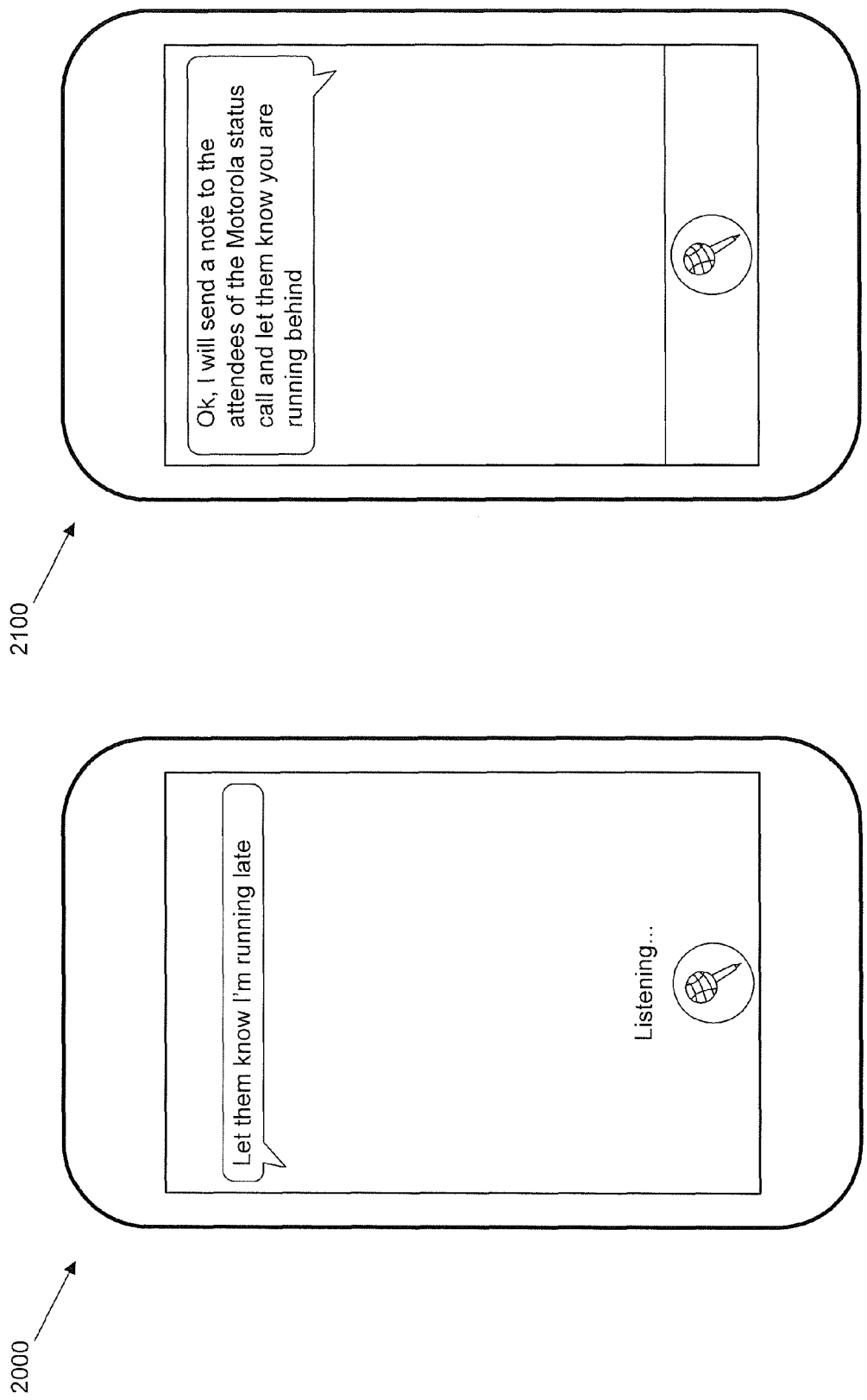

SYSTEM AND METHOD FOR SUPPORTING NATURAL LANGUAGE QUERIES AND REQUESTS AGAINST A USER'S PERSONAL DATA CLOUD

RELATED APPLICATION DATA

This application is a continuation-in-part of U.S. patent application Ser. No. 13/287,983, titled "TOOLS AND TECHNIQUES FOR EXTRACTING KNOWLEDGE FROM UNSTRUCTURED DATA RETRIEVED FROM PERSONAL DATA SOURCES", filed Nov. 2, 2011, now pending.

TECHNICAL FIELD

The disclosed technology pertains generally to search engine functionality, and more particularly to responding to natural language queries.

BACKGROUND

The modern abundance of personal data from sources such as email, contacts, and documents cannot be overstated. Indeed, there exists a significant lack of and ever-growing need for even greater abilities to process such data in meaningful ways so as to provide a user with opportunities to do more than mere keyword searches or similar actions. Current systems offer limited use of information within personal and public data and generally provide a user with little more than typical search engine functionality.

There remains a need for a way to address these and other problems associated with the prior art. More particularly, there remains a need for greater leveraging of personal data for a user, particularly with regard to responding to natural language queries.

BRIEF DESCRIPTION OF THE DRAWINGS

FIG. 3 is a block diagram illustrating an example of a system implementing a data extractor and correlator in accordance with certain embodiments of the disclosed technology.

FIG. 4 illustrates a first example of a user query interface in accordance with certain embodiments of the disclosed technology.

FIG. 11 illustrates a sixth example of a user query interface in accordance with certain embodiments of the disclosed technology.

FIG. 15 illustrates a first example of a conversational suggestion interface in accordance with certain embodiments of the disclosed technology.

FIG. 16 illustrates a second example of a conversational suggestion interface in accordance with certain embodiments of the disclosed technology.

FIG. 20 illustrates a third example of a conversational context switching and related information interface in accordance with certain embodiments of the disclosed technology.

FIG. 21 illustrates a fourth example of a conversational context switching and related information interface in accordance with certain embodiments of the disclosed technology.

DETAILED DESCRIPTION

The disclosed technology relates generally to data and query processing and more particularly but not exclusively to systems and methods for processing natural language queries by a user. For example, knowledge may be harvested from the user's personal data sources and subsequently relied on or used to respond to a natural language query from the user with meaningful information that ties together multiple pieces of data from any of a number of personal data sources and, in some embodiments, public data sources.

Figure 1:
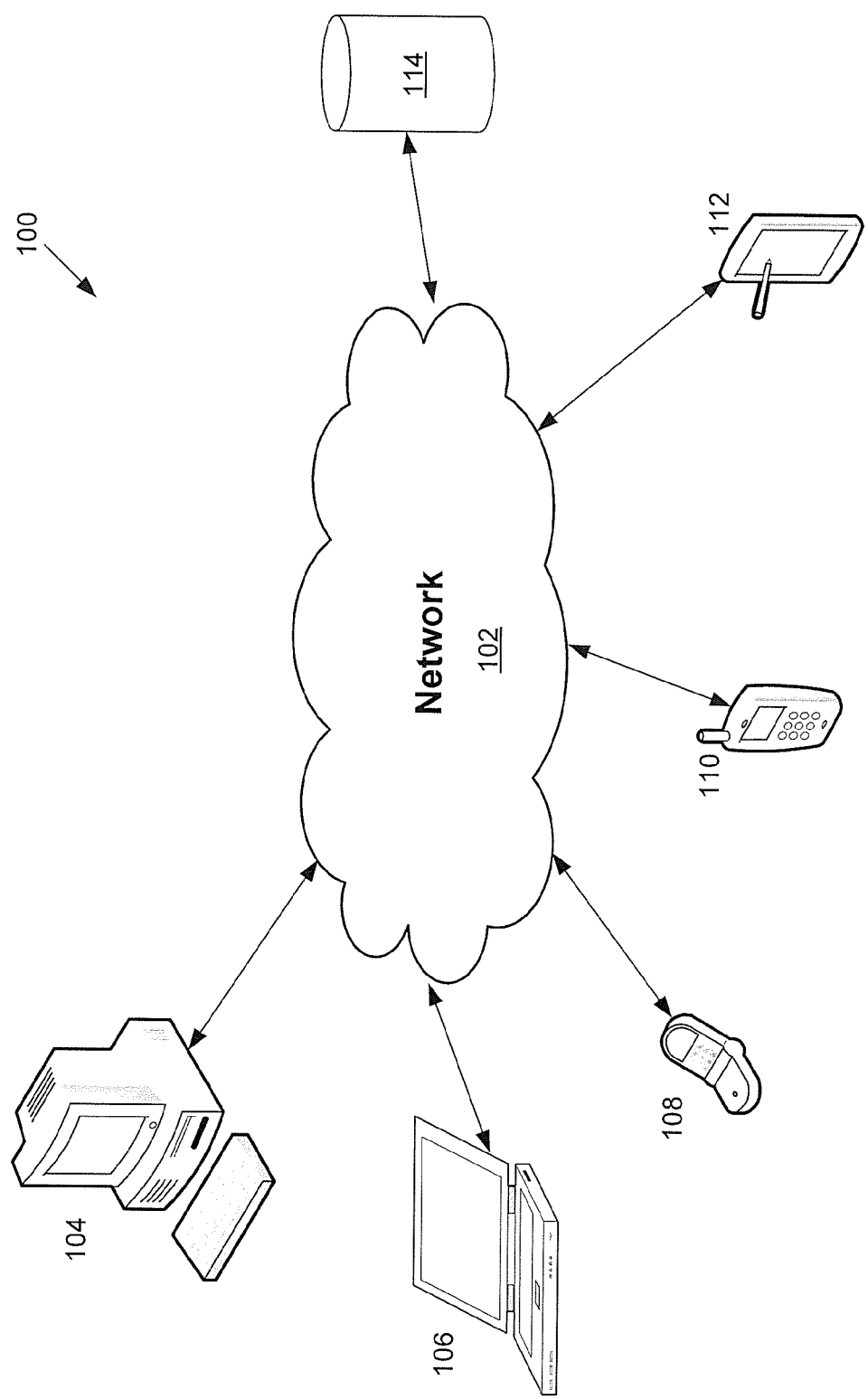
FIG. 1 is a block diagram illustrating an example of a networked system in which embodiments of the disclosed technology may be implemented.

FIG. 1 is a block diagram illustrating an example of a networked system 100 in which embodiments of the disclosed technology may be implemented. In the example, the system 100 includes a network 102 such as the Internet, an intranet, a home network, or any combination thereof. Traditional computing devices such as a desktop computer 104 and laptop computer 106 may connect to the network 102 to communicate with each other or with other devices connected to the network. The networked system 100 also includes three mobile electronic devices 108-112. Two of the mobile electronic devices, 108 and 110, are mobile communications devices such as cellular telephones or smart phones. The third mobile electronic device, 112, is a handheld device such as a personal data assistant (PDA) or tablet device.

The networked system 100 also includes a storage device 114, which may be a central database or repository, a local data store, or a remote storage device, for example. The storage device 114 may be accessible to any or all of the other devices 104-112, subject to limitations or restrictions by the devices 104-112, a third party, or the storage device 114 itself. The storage device 114 may be used to store some or all of the personal data that is accessed and/or used by any of the computers 104 and 106 or mobile electronic devices 108-112. In situations involving public data, the storage device 114 may also store any or all of the public data accessed and/or used by any of the computers 104 and 106 or mobile electronic devices 108-112.

Figure 2:
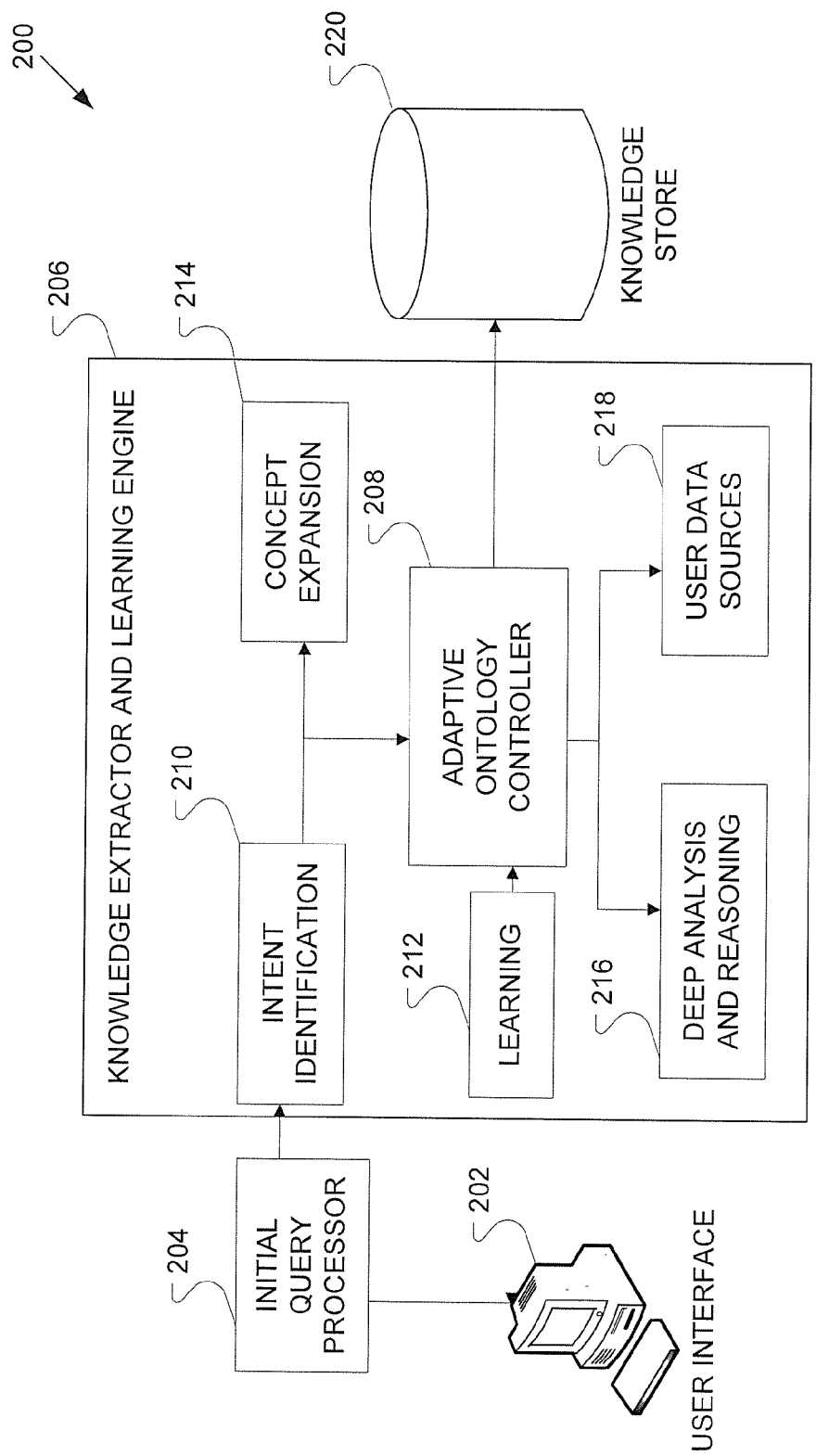
FIG. 2 is a block diagram illustrating an example of a system implementing an adaptive ontology controller in accordance with certain embodiments of the disclosed technology.

FIG. 2 illustrates an example of a system 200 implementing an adaptive ontology controller (AOC) in accordance with certain embodiments of the disclosed technology. A knowledge worker may interact with the system by way of a user interface 202 such as the desktop computer 104 of FIG. 1. An initial query processor 204 may receive input from the user, such as natural language queries or requests, via the user interface 202 and provide the user input to a knowledge extractor and learning engine (KELE) 206. In certain embodiments, the user may provide the input by voice in place of or in connection with providing the input by way of traditional means such as typing.

The AOC 208 is part of the KELE 206, which includes various other subsystems such as an intent identification module 210, a learning module 212, a concept expansion module 214, a deep analysis and reasoning module 216, and various user data sources 218 that provide personal data and information. The AOC 208 is configured to interact with a knowledge store 220, such as the storage device 114 of FIG. 1.

FIG. 3 is a block diagram illustrating an example of a system 300 implementing a machine-implemented data extractor and correlator 302 in accordance with certain embodiments of the disclosed technology. In the example, the data extractor and correlator 302 is configured to retrieve personal data from any of a number of personal data sources 304A-n. The personal data sources 304A-n may include, but is not limited to, an email message, a calendar item, a customer relationship management (CRM) application object, an address book entry, a tweet, a blog entry, a file, a folder, a presentation, and a document.

The system 300 also includes a knowledge store 306 configured to store knowledge, generally in the form of structured data. As used herein, the term structured data generally refers to data or information that is identifiable because it is organized in a structure. Structured data is typically searchable by data type within content, readily understood by computing devices, and efficiently organized for human readers. Structured data as described herein can generally be used to identify a person, place, or item involved with a particular field or industry, e.g., sales. Such structured data could include, but is not limited to, fields in a CRM application, such as contact information, account name, contact name, invoice number, and phone number.

Structured data is usually organized in such a way that it is readily and often easily searchable, presentable, or useable by an application or user. In contrast, the term unstructured data as used herein generally refers to data that has no identifiable structure. Unstructured data may include content that is similar or even identical to corresponding structured data but is not organized in such a way that it is readily or easily searchable, presentable, or useable by an application or user. Whereas data corresponding to a "sender" field in an email message is usually structured data, for example, the typical freeform text of the email body is generally unstructured data.

The data extractor and correlator 302 is configured to retrieve personal data from at least one of the personal data sources 304A-n. For example, the data extractor and correlator 302 may be configured to retrieve all incoming email messages subject to a filter, e.g., all email messages from a certain sender or originator. Alternatively or in addition thereto, the data extractor and correlator 302 may retrieve all documents created by or edited by the user. A functional or actual filter may be used to specify that only certain documents, e.g., documents pertaining to sales involving the user, are to be retrieved by the data extractor and correlator 302.

The data extractor and correlator 302 is further configured to extract information from unstructured data within the retrieved personal data. For example, an email message retrieved from the data extractor and correlator 302 may contain unstructured data such as freeform text in the subject or body of the message. In such a situation, the data extractor and correlator 302 may extract certain words, terms, or phrases, such as contact information or sales-related information, from the unstructured data within the message.

The data extractor and correlator 302 is further configured to correlate the extracted information with previously stored structured data, e.g., stored in the knowledge store 306, to generate additional structured data. For example, consider a situation in which the data extractor and correlator 302 extracts additional information, e.g., a secondary phone number extracted from the body of an email message, that pertains to a sales contact having information, e.g., a name and a primary phone number, that is already stored in the knowledge store 306. The extracted information (secondary phone number) will be correlated with the previously stored structured data (existing name and primary phone number) to generate additional structured data (secondary phone number added to or associated with the existing contact).

The knowledge store 306 is configured to store additional structured data as well as previously stored structured data. The data extractor and correlator 302 thus provides output in the form of enriched knowledge that may be stored within the storage device 306 and used in subsequent queries or applications by the user or other users or even other applications. For example, in the situation described above, a subsequent query by a user involving the sales contact may provide the secondary phone number without the user needing to perform an additional or more detailed search for the information.

The system 300 also includes a natural language query module 307 that may be used to generate responses to natural language queries submitted by users to the system 300. For example, the natural language query module 307 may access structured information stored by the knowledge store 306 and, in some embodiments, the natural language query module 307 may also interface directly with the data extractor and correlator 302. The responses generated by the natural language query module 307 to be provided to the user are based at least in part on the structured information within the knowledge store 306. For example, if a user submits a query pertaining to a sales lead whose information is stored within the knowledge store 306, the natural language query module 307 may automatically generate a response that contains certain information, such as contact information, that pertains to the sales lead.

FIG. 4 illustrates a first example of a user query interface 400 in accordance with certain embodiments of the disclosed technology. The user query interface 400 may be presented to a user as at least part of a start page for a specific application or program suite, for example.

The user query interface 400 includes a user input box 402 in which a user may enter a keyword or natural language query or command. In certain embodiments, a message appears in the user input box 402 before and/or while the user is entering information in the user input box 402. As shown in the figure, for example, the user input box 402 may indicate that the user should either type something or tap somewhere else on the user query interface 400. Alternatively or in addition thereto, the user may enter queries by voice. The user may also edit by voice commands queries that were entered by either typing or voice. After or during entry of a query, the user query interface 400 may display certain elements in a distinguishable manner. For example, certain key elements identified within the query such as names, companies, or locations, for example, may be underlined or presented in a bubble with an X icon by the user query interface 400. This may enable easy editing of the query by the user.

Below the user input box 402, a suggestions panel 404 may offer contextual, real-time suggestions of various items for which the user may wish to search. The items listed in the suggestions panel 404 may be correlated to recent activity across the user's personal cloud and/or items that appear to have higher volume and/or focus over the recent timeframe, for example. The list of items may serve to guide the user by showing the user what is available to him or her and what he or she may wish to ask in a query. The listed items may also be driven by contextual items such as location, time, or awareness of the user's next meeting, for example. In certain embodiments, the suggestions panel 404 organizes multiple suggestions into multiple categories such as documents, email, and contacts, for example.

In certain embodiments, a recent queries panel 406 may list one or more recent queries previously presented by the user. The queries may have been generated at the user input box 402 or elsewhere. The recent queries panel 406 conveniently enables a user to refresh his or her memory and/or re-conduct a specific search. In certain embodiments, the recent queries panel 406 may organize multiple queries into multiple categories such as contacts or documents, for example.

Figure 5:
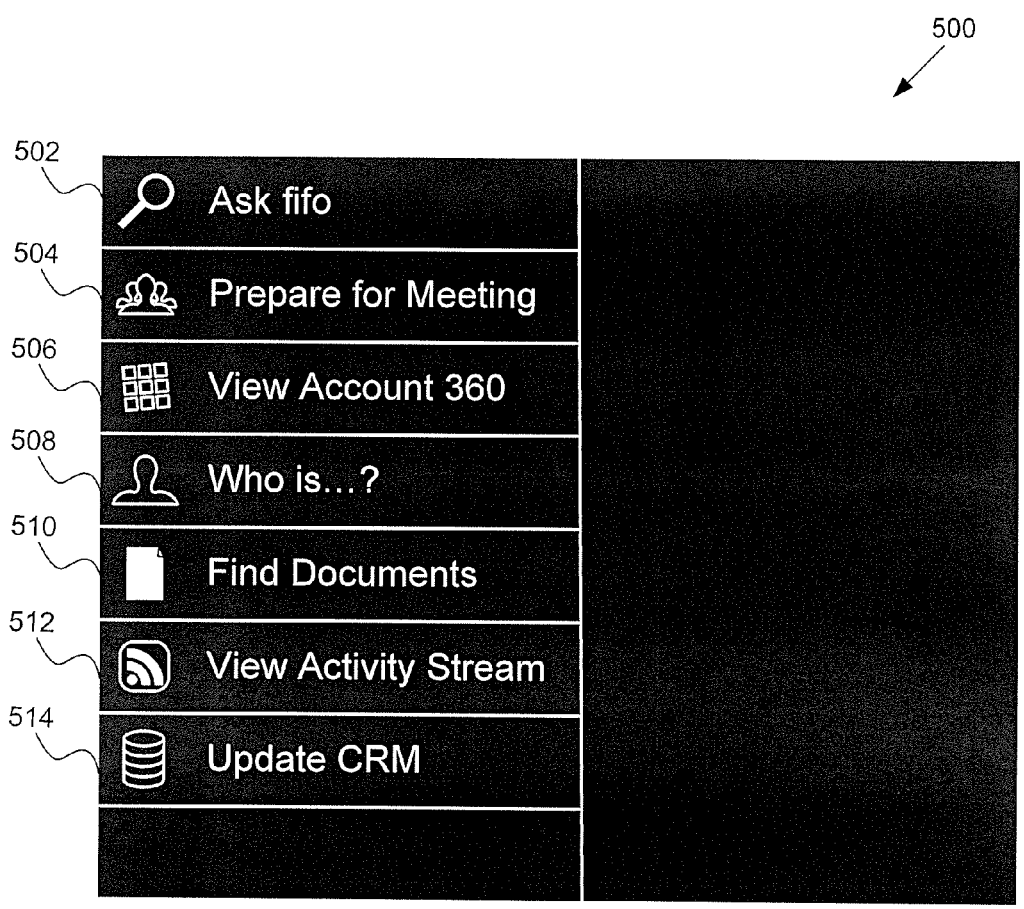
FIG. 5 illustrates an example of an actions menu interface in accordance with certain embodiments of the disclosed technology.

FIG. 5 illustrates an example of an actions menu interface 500 in accordance with certain embodiments of the disclosed technology. The actions menu interface 500 lists multiple actions 502-514 that a user may select. Selection of a first action 502 may enable a user to enter a query by way of the user query interface 400 of FIG. 4, for example. Alternatively or in addition thereto, the user may enter the query by voice.

A second action 504 may be selected to provide the user with a 360-degree view around a meeting, e.g., information about attendees, topic, location, relevant email and documents, etc. A third action 506 may be selected to provide the user with a 360-degree view around a particular account. A fourth action 508 may be selected to provide the user with a 360-degree view around a particular contact. A fifth action 510 may enable a user to find one or more documents by way of the user query interface 400 of FIG. 4, for example. Selection of a sixth action 512 may cause the system to present to the user an activity stream of recent activities, which may include activities of the user's friends, teammates, etc. A seventh action 514 may enable the user to update specific fields in a CRM application connected to the system, for example.

The actions menu interface 500 may be a fixed menu of actions, a dynamic menu of actions, or a combination thereof. Fixed menu items may include, but are not limited to, various types of items such as accounts, documents, contacts, locations, and scheduled meetings, for example. A dynamic menu of actions may present to the user one or more actions that may be based on recent items that appear to have high activity across the user's personal cloud or on context, for example.

Figure 6:
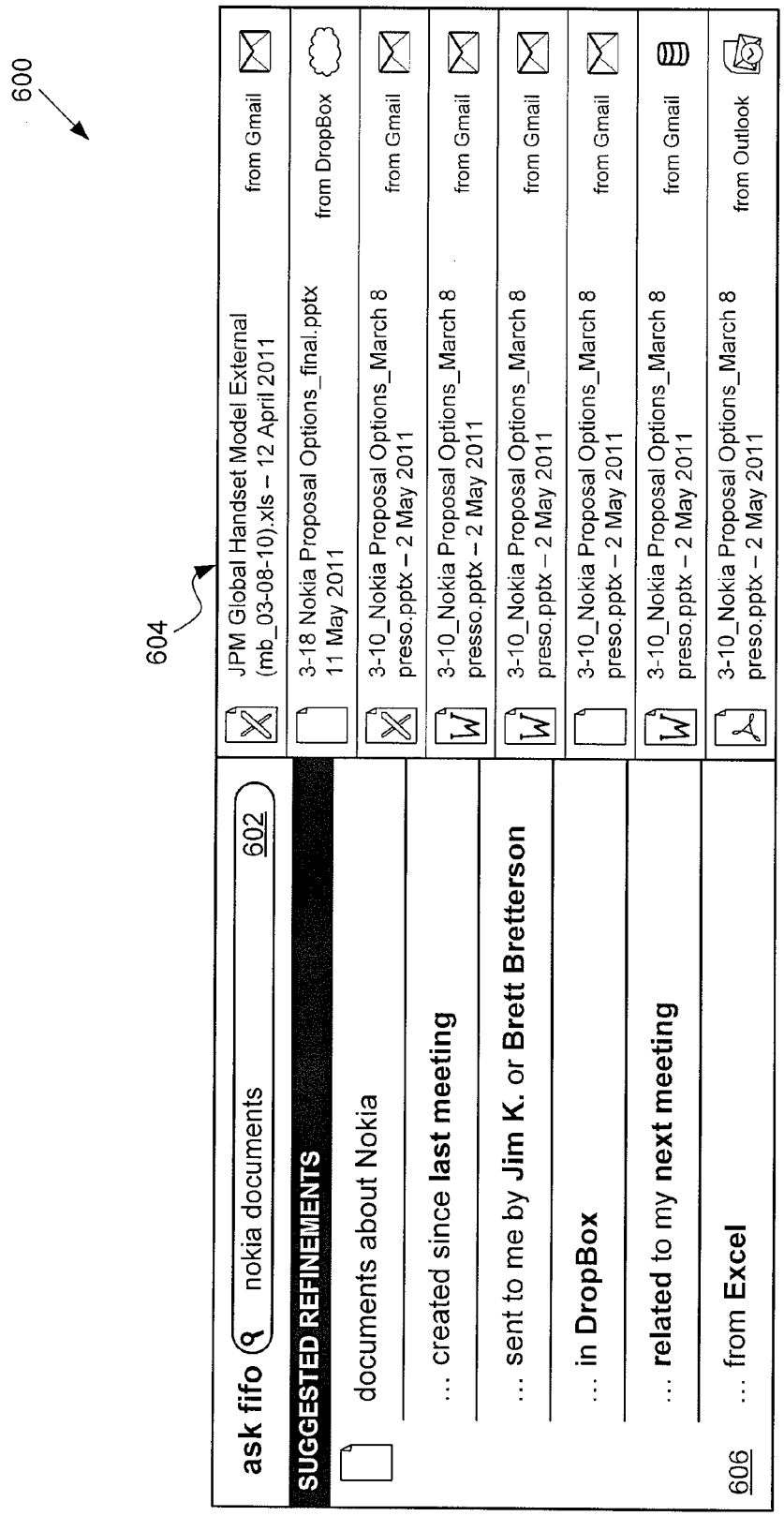
FIG. 6 illustrates a second example of a user query interface in accordance with certain embodiments of the disclosed technology.

FIG. 6 illustrates a second example of a user query interface 600 in accordance with certain embodiments of the disclosed technology. The user query interface 600 has a user input box 602 in which a user may type one or more words or terms as part of a search or command to be performed by the system. Alternatively or in addition thereto, the user may enter commands and/or queries by voice.

In certain embodiments, a suggestions panel 604 may present one or more suggestions to the user as the user types information into the user input box 602 or as the user starts issuing a voice query or command. The suggestions panel 604 may update the listed suggestions after each typed character by the user, for example. The user query interface 600 also includes a suggested refinements panel 606 to offer one or more intelligent refinements that are gathered from semantically indexing the user's personal cloud, for example.

In the illustrated example, a user wishing to search for information pertaining to certain documents about the company Nokia types "nokia documents" into the user input box

602. At some point during the typing or talking, the suggestions panel 604 presents multiple suggestions that are based on any of a number of semantically indexed factors including the user's previous searches, meetings in the user's calendar, email correspondence with the user, etc. The suggested refinements panel 606 presents a number of refinements that may be of interest to the user in narrowing, expanding, or refining the search. For example, the user may wish to search only documents that have been created since the last meeting. These suggestions can also be used as a form of information discovery because they may enable a user to explore what type of information is available concerning a concept, query, command, etc. In certain embodiments, the system only displays refinements that are relevant based on the query and context and yield some results.

Figure 7:
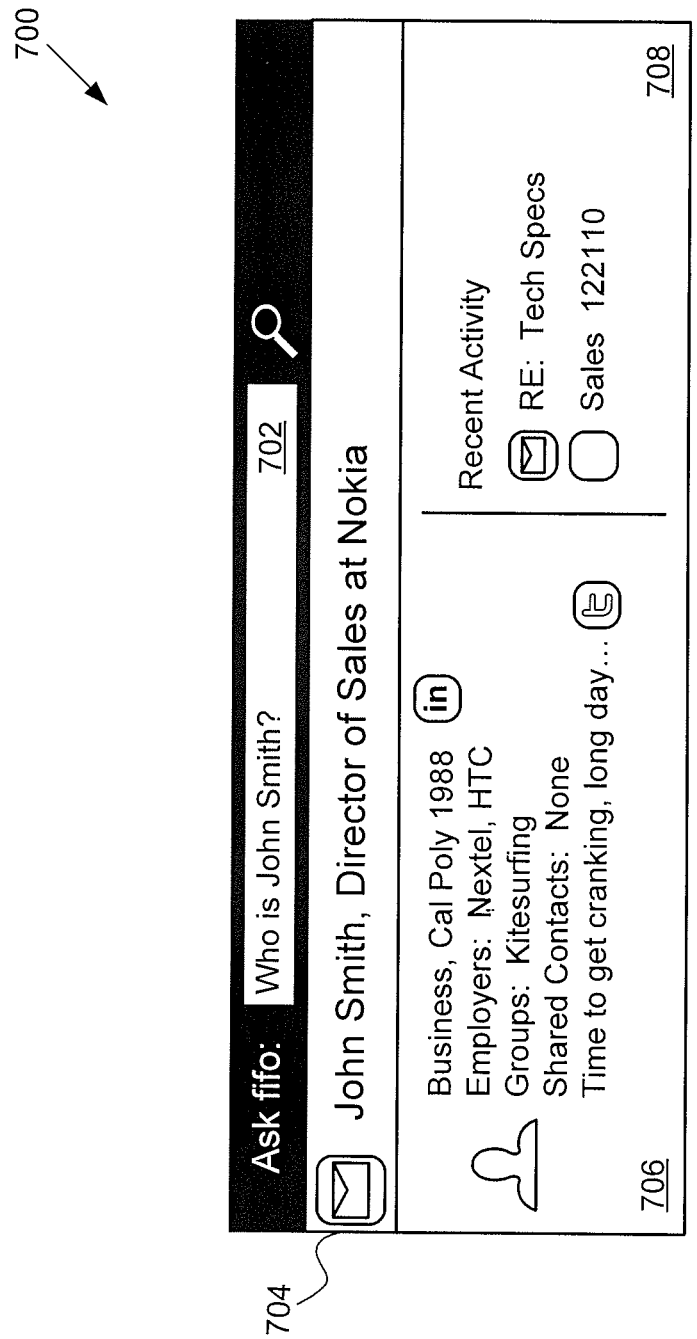
FIG. 7 illustrates a third example of a user query interface in accordance with certain embodiments of the disclosed technology.

FIG. 7 illustrates a third example of a user query interface 700 in accordance with certain embodiments of the disclosed technology. Using a user input box 702, a user may enter a natural language query to be performed against the user's personal cloud. Alternatively or in addition thereto, the user may enter the query by voice.

The system may present one or more results 704 of the query to the user based on a confidence level. For example, if there is only one result 704 that meets a confidence threshold, the system may present only that result 704. The system may also present descriptive information 706 pertaining to the result 704 and recent activity 708 pertaining to the result 704. If there are multiple results 704, the system could list the results 704 in descending order of confidence level and/or group the results 704 by category or some other attribute, for example. In certain embodiments, the one or more results 704 presented to the user in response to the query may be customized by the system depending on the query.

In the example, a user enters the following natural language query into the user input box 702: "Who is John Smith?" The system performs the query against the user's personal cloud and finds an entry for "John Smith, Director of Sales at Nokia." For example, this entry may be an entry within the user's personal address book. In the example, because this entry is the only such entry that exceeds a confidence threshold, the system presents the entry to the user in the form of a search result 704 along with descriptive information 706 and recent activity 708 pertaining to the result 704.

Figure 8:
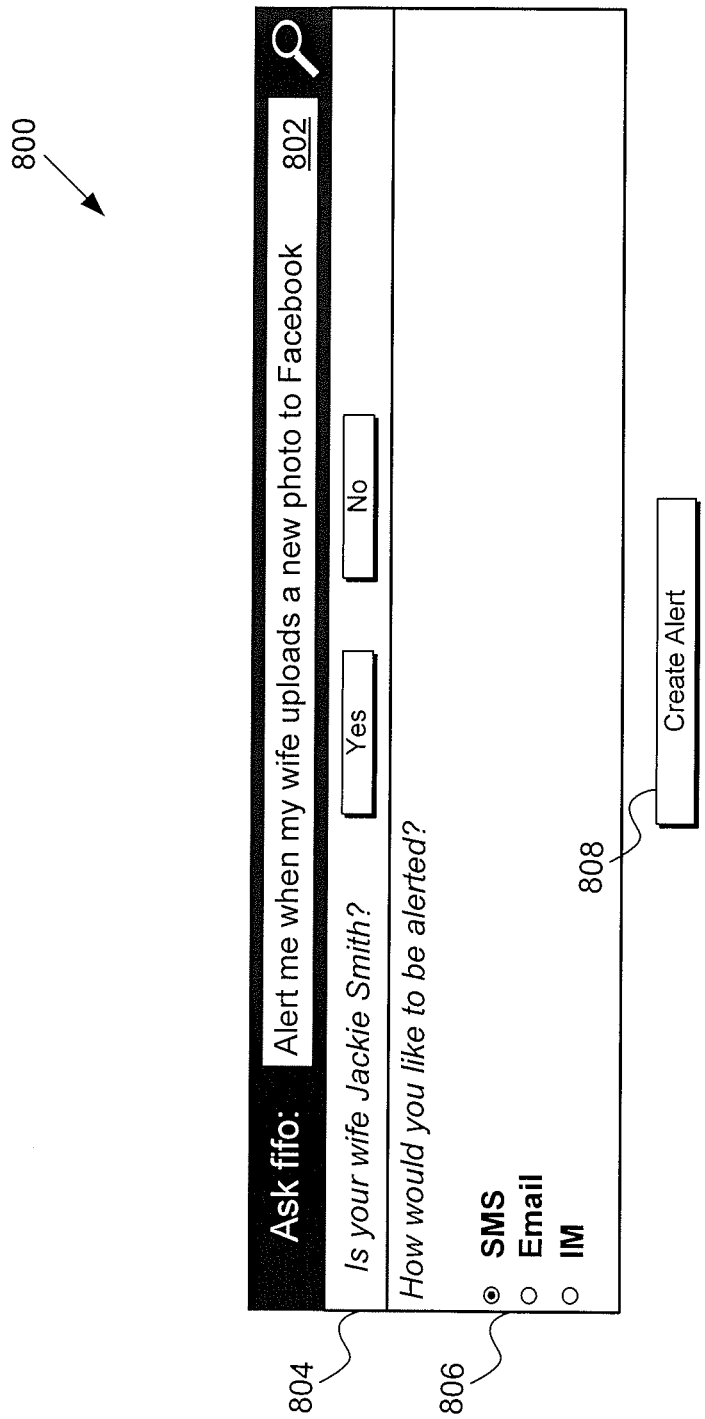
FIG. 8 illustrates a fourth example of a user query interface in accordance with certain embodiments of the disclosed technology.

FIG. 8 illustrates a fourth example of a user query interface 800 in accordance with certain embodiments of the disclosed technology. In situations where the system may not be certain of the answer to a query or command received from a user via a user input box 802, the system may ask the user for further clarification by way of a dialog panel 804. The user query interface 800 may also include an alert creation panel 806 and alert creation button 808 with which a user may interact to create an alert based on the submitted query.

In the illustrated example, a user enters the following natural language command using a user input box 802: "Alert me when my wife uploads a new photo to Facebook." The system then asks the user by way of the dialog panel 806 as to whether the user's wife is Jackie Smith. Based on the user response, the system can propagate and transfer that learning to improve precision of the overall system. The system also enables the user to create an alert using the alert creation panel 806 and alert creation button 808. For example, the user may specify as to whether the alert is to be sent via SMS, email, or IM.

Figure 9:
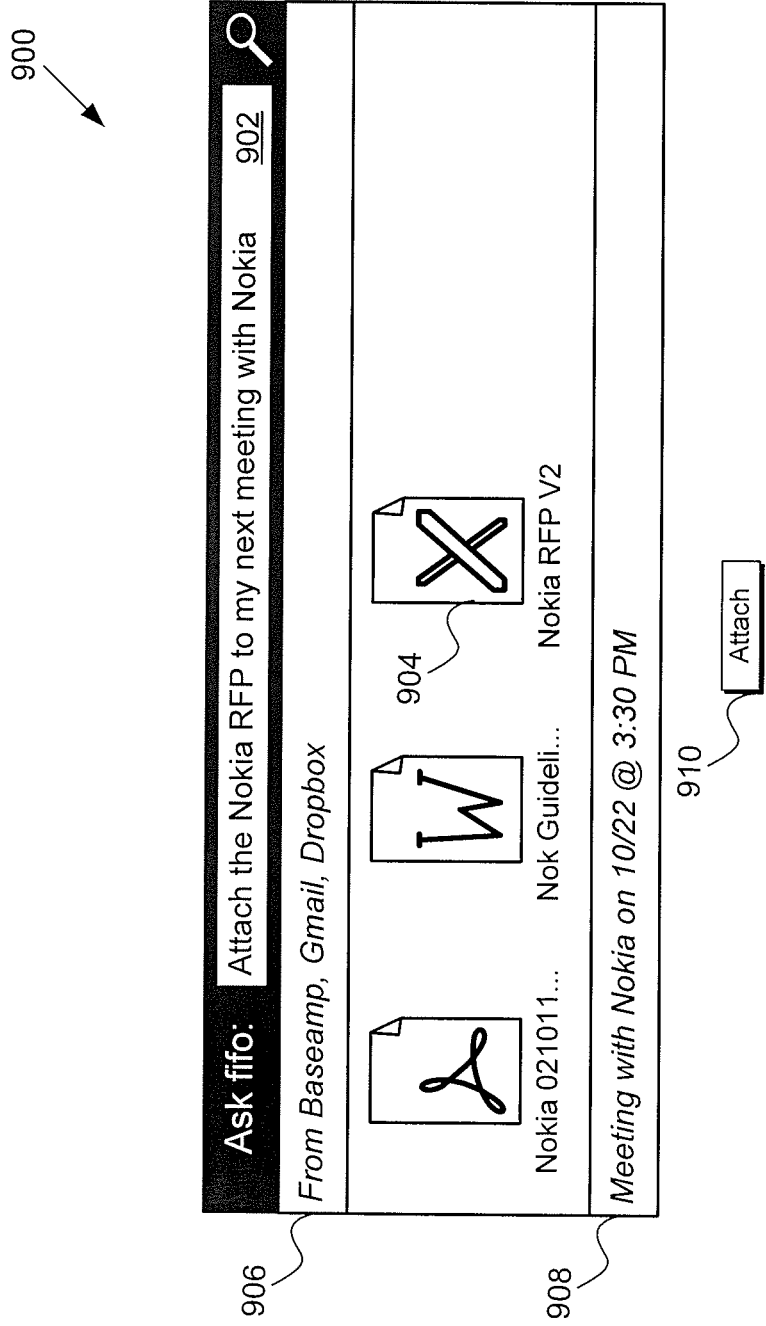
FIG. 9 illustrates a fifth example of a user query interface in accordance with certain embodiments of the disclosed technology.

FIG. 9 illustrates a fifth example of a user query interface 900 in accordance with certain embodiments of the disclosed technology. The user query interface 900 has a user input box 902 in which a user may type a natural language query or command to be performed by the system against the user's personal data cloud. Alternatively or in addition thereto, the user may enter the query or command by voice.

In the example, the user has entered a natural language command in the user input box 902 directing the system to attach a document 904 from one data source, as indicated at 906, to a different data source, as indicated at 908, across the user's personal cloud. The system may present multiple items based on a confidence level corresponding to each so as to ensure that the proper document 904 is identified. Once the user has confirmed that the correct document has been found, or selected the proper document should the system present multiple items to him or her, the user may then press a button 910 to direct the system to follow through with the desired attaching operation.

Figure 10:
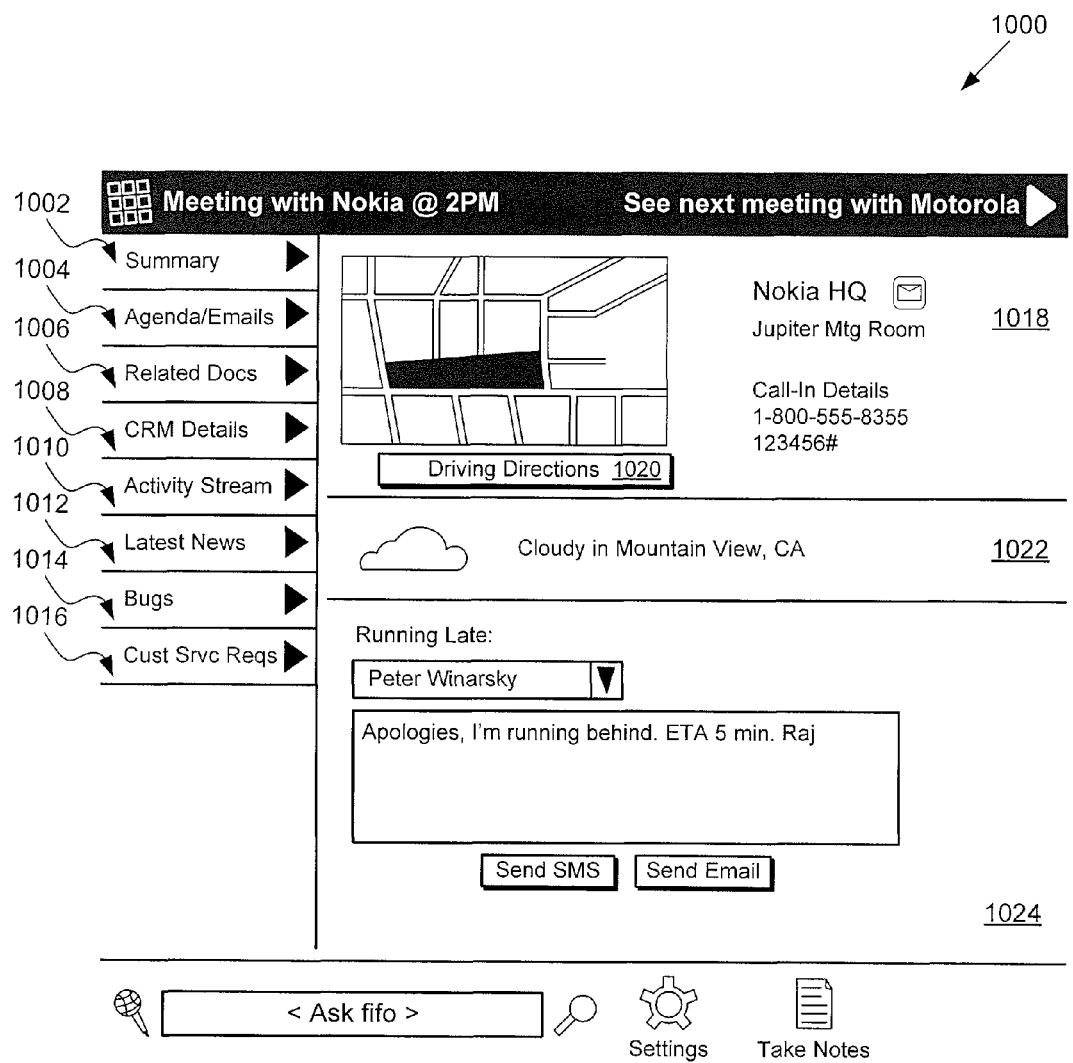
FIG. 10 illustrates a first example of a user interaction interface in accordance with certain embodiments of the disclosed technology.

FIG. 10 illustrates a first example of a user interaction interface 1000 in accordance with certain embodiments of the disclosed technology. In certain embodiments, the user interaction interface 1000 may result from selection of the second action 504 of FIG. 5. The user interaction interface 1000 incorporates multiple tabs for a customized user experience. In the example, the user interaction interface 1000 is responding to the following natural language query as presented by a user: "Prepare me for my next meeting." Responsive to the query, the user interaction interface 1000 provides multiple answers that are customized to the user. For example, the user interaction interface 1000 provides the user with a button 1002 to access a summary of the meeting, a button 1004 to access agenda/emails related to the next meeting, a button 1006 to access documents that are related to the meeting, a button 1008 to provide a summary of CRM details for the pertinent account, a button 1010 to access an activity stream corresponding to the meeting, a button 1012 to see the latest news corresponding to the meeting, a button 1014 to provide an update on bugs, and a button 1016 to view current customer service requirements.

In the example, the user interaction interface 1000 also provides the user with a location information panel 1018 that includes a map, an address, and a phone number corresponding to the meeting location, as well as a directions request button 1020 to direct the system to generate or access previously generated driving directions to the location. In certain embodiments, the user interaction interface 1000 may provide a weather forecast panel 1022 to provide a current weather forecast snapshot for the geographic location of the meeting. The user interaction interface 1000 may also provide a messaging panel 1024 configured to enable the user to send a message to one or more of the other meeting participants or invitees via SMS or email, for example.

FIG. 11 illustrates a second example of a user interaction interface 1200 in accordance with certain embodiments of the disclosed technology. The user interaction interface 1200 is similar to the user interaction interface 1000 of FIG. 10 but further demonstrates the explicit learning capabilities of the disclosed technology. For example, a user can notify the system that a certain email message 1102 has been mis-filed and subsequently assign the message to the correct account using a user interaction panel 1104. Other examples of explicit feedback may include, but are not limited to, "star ratings," "thumbs-up or thumbs-down," and "numbered scale" mechanisms.

Figure 12:
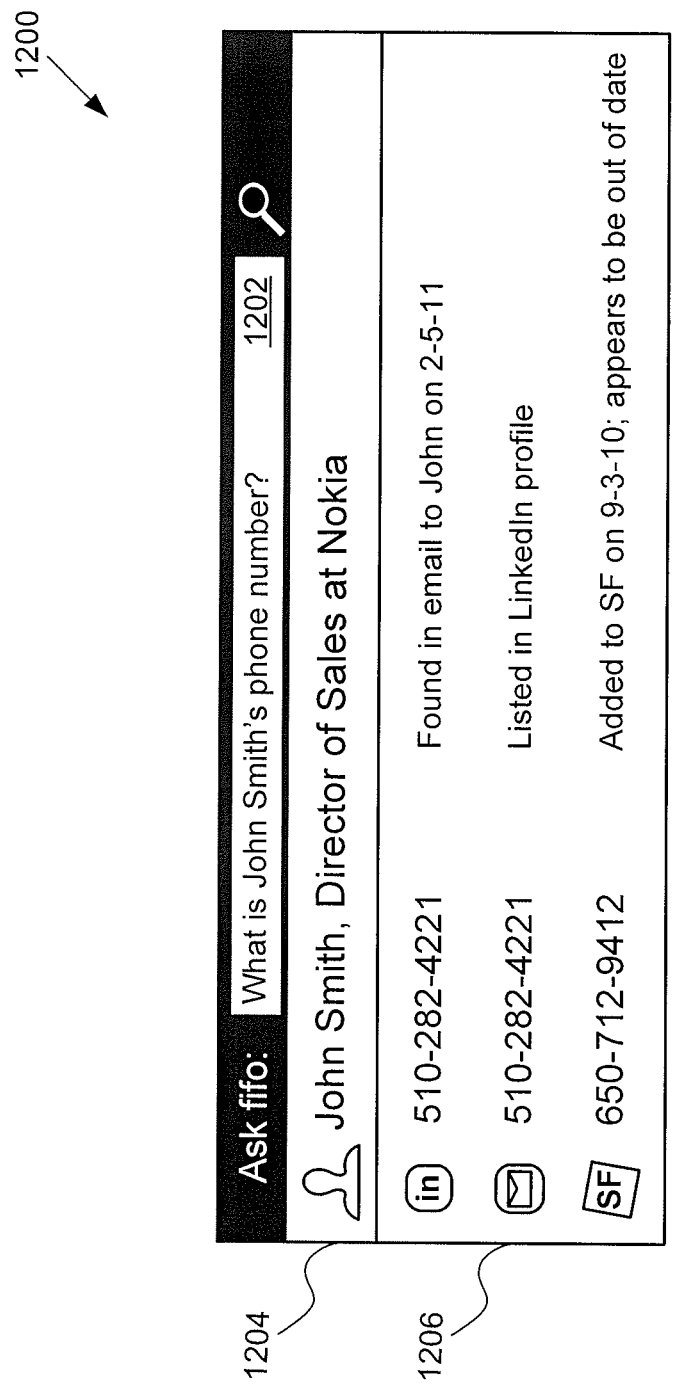
FIG. 12 illustrates a second example of a user interaction interface in accordance with certain embodiments of the disclosed technology.

FIG. 12 illustrates a sixth example of a user query interface 1200 in accordance with certain embodiments of the disclosed technology. In the example, a user enters the following natural language query using a user input box 1202: "What is John Smith's phone number?" Alternatively or in addition thereto, the user may enters the query by voice. The system finds and presents to the user an entry 1204 for a John Smith. In the example, only one result is shown. This is likely because there is only one John Smith in the user's data or because the algorithm determined with a very high likelihood that this John Smith is the specific person the user was looking for.

The system also finds and presents to the user a listing 1206 of multiple phone numbers corresponding to the user from one or more data sources within the user's personal cloud. The user's interaction with the listing 1206 is captured as implicit learning. Consider a scenario in which the user issued the query from a mobile device and then clicked on the second phone number in the listing to make a call. In such a situation, the system would capture that learning and, in subsequent searches, rank that phone number higher in the result set.

Figure 13:
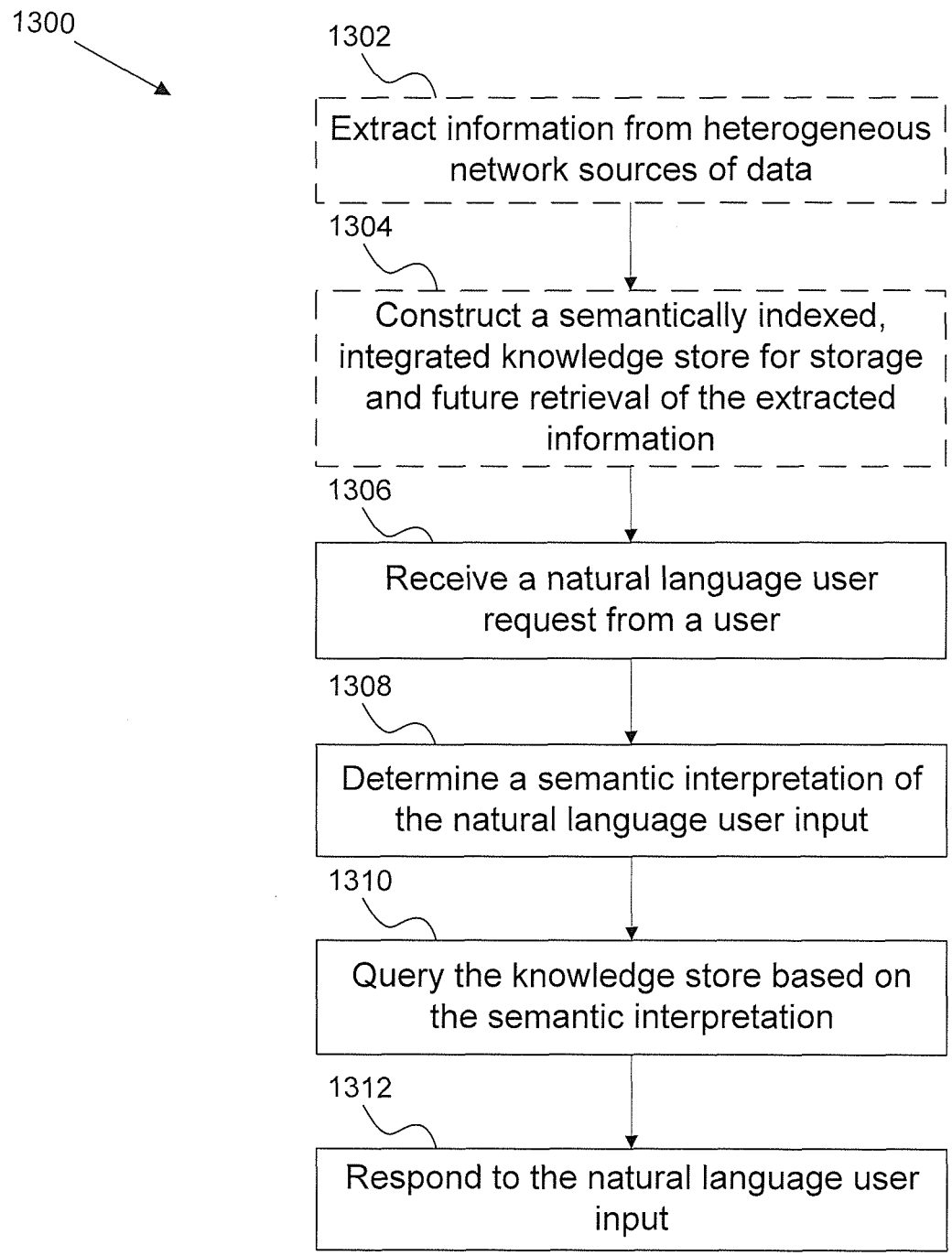
FIG. 13 is a flowchart illustrating an example of a machine-implemented method of supporting a natural language user request against a user's personal data cloud in accordance with certain embodiments of the disclosed technology.

FIG. 13 is a flowchart illustrating an example of a machine-implemented method 1300 for supporting a natural language user input against a user's personal data cloud in accordance with certain embodiments of the disclosed technology. At 1302, information is extracted from multiple heterogeneous network sources of data. The network sources may include, but are not limited to, multiple network-based user accounts that are each associated with email, social networks, file sharing, calendar(s), media libraries, note-taking applications, enterprise software, CRM, customer support software, corporate wikis, project management software, source code development, maintenance systems, and any combination thereof.

The information extracted from the network sources of data typically includes one or both of structured and unstructured personal textual data corresponding to the user. The personal textual data may be retrieved from or correspond to any or all of the user's contacts, calendar events, email, personal notes, to-do lists, shared documents, music, photos, videos, personal financial data, corporate data, CRM, and virtually any other data or information source. The extracting may include processing at least a portion of the unstructured data based on an analysis of at least a portion of the structured data.

At 1304, a semantically indexed, integrated knowledge store is constructed for storage and future retrieval of the information that is extracted at 1302. Constructing the semantically-indexed, integrated knowledge store may include the performing of an automated semantic analysis of the extracted information such as one or both of automatic clustering and tagging operations, for example.

At 1306, a natural language user request is received from the user. As used herein, a user request generally refers to a query or other command that is input by a user requesting information or other assistance from the system. The natural language user request is typically in the form of a query, command, or both. The natural language user request may be entered by way of typing, talking, or any other suitable mechanism or technique. In certain embodiments, the natural language user request includes one or more automatically suggested words. Certain implementations may include receiving and responding to a non-natural language request received from the user.

At 1308, a semantic interpretation of the natural language user request is determined. This operation is discussed in greater detail below with reference to FIG. 14.

At 1310, the semantically-indexed, integrated knowledge store is queried based at least in part on the semantic interpretation determined at 1308.

At 1312, the system responds to the natural language user request by displaying one or more results of the querying performed at 1310. The results generally correspond to at least one item within the user's personal data cloud.

The displaying may include presenting to the user a ranked list of alternative potential responses to the natural language user request based on the results of the querying performed at 1310. In certain embodiments, the ranked list may be refined based on additional user inputs solicited from the user by the system.

In certain embodiments, information may be extracted from one or more public data sources in addition to the information extracted from the user's personal data cloud at 1302. Alternatively or in addition thereto, either or both of the querying and responding operations performed at 1310 and 1312, respectively, may include interaction with and results from the one or more public data sources in addition to the personal textual data extracted from the user's personal data cloud.

In certain embodiments, the responding at 1312 may include determining a ranked list of online documents containing a probable answer responsive to the natural language user request. In these embodiments, the displaying typically includes presenting to the user the ranked list.

In other embodiments, the responding at 1312 may include determining at least one probable answer responsive to the natural language user request. In these embodiments, the displaying typically includes presenting to the user the at least one probable answer. Alternatively or in addition thereto, the responding may include a disambiguation, follow-up, refinement, or dialog mechanism.

Alternatively or in addition thereto, the responding at 1312 may include invoking network services to perform a desired action responsive to the natural language user request. In certain ones of these embodiments, the network services include an alert creation mechanism configured to create an alert and the desired action includes creation of the alert. In other ones of these embodiments, the network services include a reminder creation mechanism configured to create a reminder and the desired action includes creation of the reminder.

The responding at 1312 may include one or both of integrating multiple results of the querying and integrating at least one of the results of the querying with one or more additional results obtained by querying network information sources that are external to the knowledge store. Such external network information sources may include a geographic positioning system (GPS) source. In these embodiments, the additional results typically include a geographic location corresponding to at least one of the results.

Figure 14:
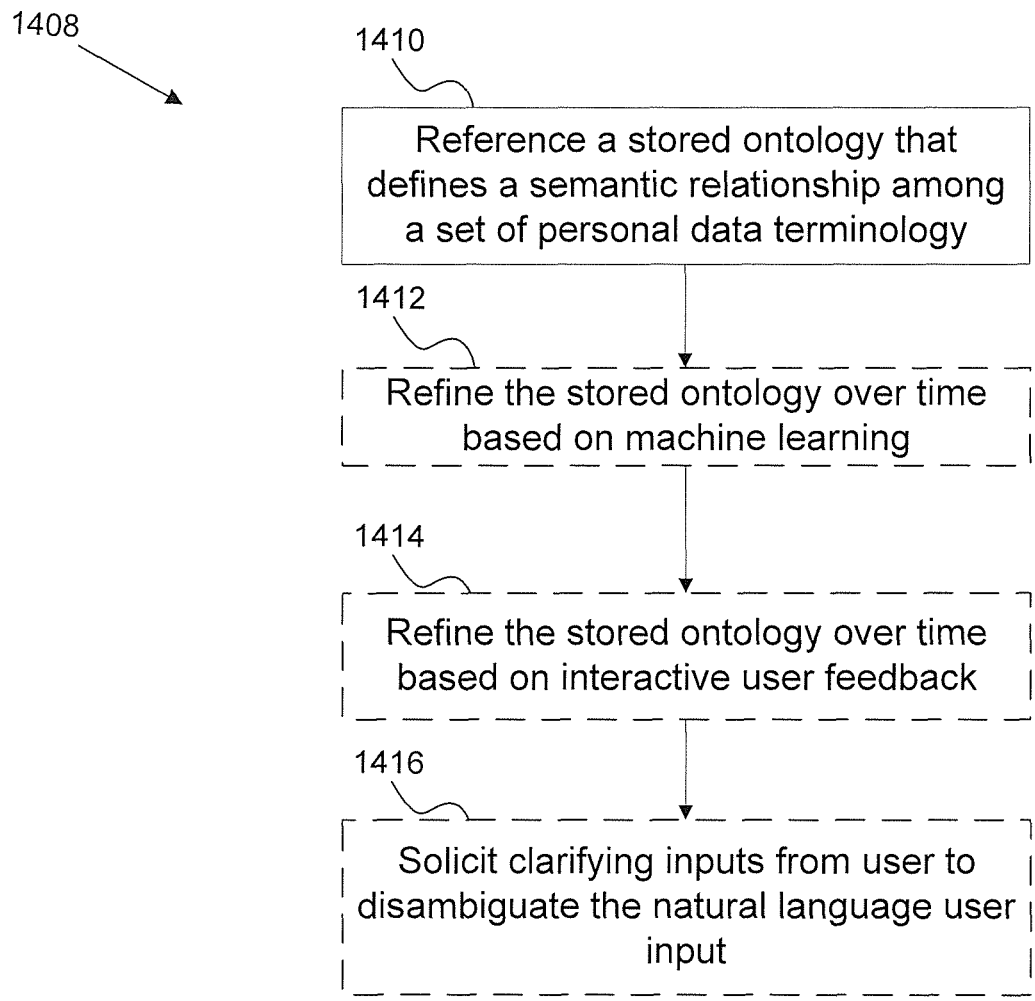
FIG. 14 is a flowchart illustrating an example of a machine-implemented method of determining a semantic interpretation of a natural language user request in accordance with certain embodiments of the disclosed technology.

FIG. 14 is a flowchart illustrating an example of a machine-implemented method 1408 of determining a semantic interpretation of a natural language user request, such as the determining performed at 1308 of FIG. 13, in accordance with certain embodiments of the disclosed technology. At 1410, a stored ontology that defines a semantic relationship among a set of personal data terminology is referenced. In certain embodiments, the stored ontology is refined over time based at least in part on machine learning, as indicated at 1412. Alternatively or in addition thereto, the stored ontology is refined over time based at least in part on interactive user feedback, as indicated at 1414. Such interactive user feedback may include star rating, thumbs-up or thumbs-down, and numbered scale mechanisms, for example.

In certain embodiments, clarifying inputs may be solicited from the user to disambiguate the natural language user request, as indicated at 1416.

FIG. 15 illustrates a first example of a conversational suggestion interface 1500 in accordance with certain embodiments of the disclosed technology. In the example, a user submits a query pertaining to emails concerning and/or associated with a certain company, here Nokia. The system conducts a search for potential matches and provides the results to the user. The results may be provided by way of visual presentation, audible presentation, or combination thereof. The search may be conducted against any of a number of storage spaces including, but not limited to, the user's personal mail archive and the user's company's mail archive. In the example, three emails have been identified as a result of the search and are presented to the user. The interface 1500 includes a voice input button or icon (indicated by a microphone symbol) and a help button or icon (indicated by a question mark). In certain embodiments, either or both of these features may be activated by voice commands from the user.

Figure 17:
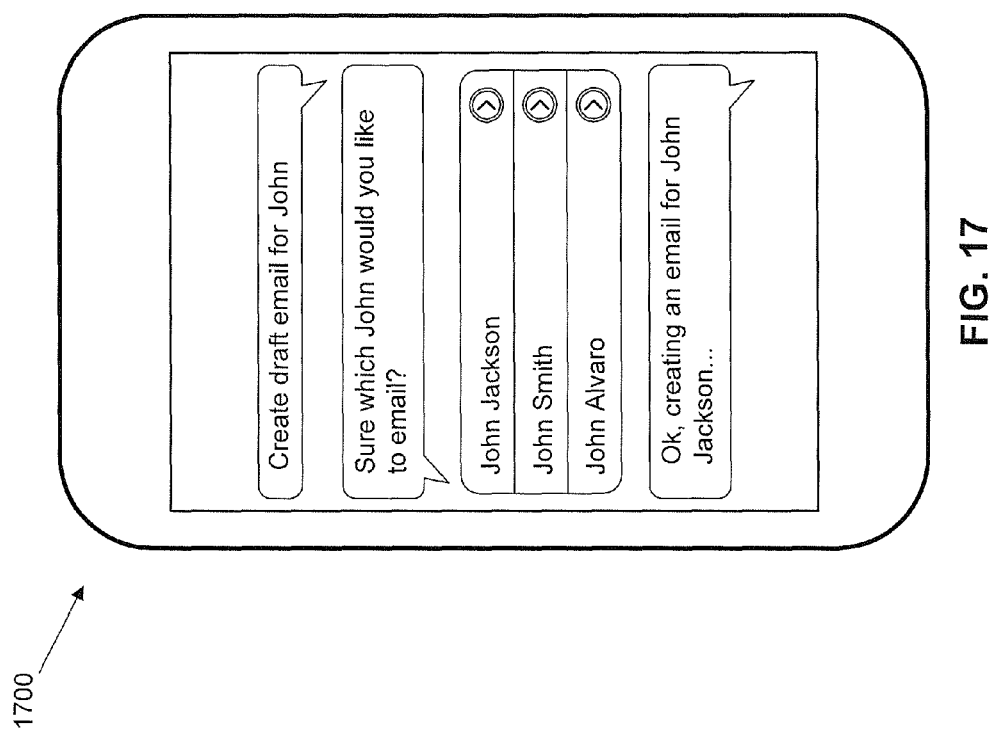
FIG. 17 illustrates an example of a dialog disambiguation interface in accordance with certain embodiments of the disclosed technology.

FIG. 16 illustrates a second example of a conversational suggestion interface 1600 in accordance with certain embodiments of the disclosed technology. This interface 1600 is an example of an interface resulting from a user selecting the help button in the interface 1500 of FIG. 15 and, like the interface 1500 of FIG. 15, includes a voice input button or icon (indicated by a microphone symbol). In the example, the interface 1600 provides the user with a list of available voice commands that the user may take advantage of using either the interface 1500 of FIG. 15 or the interface 1600 of FIG. 16. The interface 1600 of FIG. 16 may also include a Back button or icon to enable the user to return to the interface 1500 of FIG. 15. In certain embodiments, the Back feature may be activated by voice commands from the user. In certain situations, it may be preferable or even necessary to disambiguate certain elements of a query, such as a person's name for example. FIG. 17 illustrates an example of a dialog disambiguation interface 1700 in accordance with certain embodiments of the disclosed technology. In the example, a user provides as input a command for a draft email for "John" to be created. Responsive to the identification "John," a search is performed and the interface 1700 then provides the results of the search, in this case "John Jackson," "John Smith," and "John Alvaro." The results may be provided by way of visual presentation, audible presentation, or combination thereof. In the example, the user indicates that "John" refers to "John Jackson," e.g., by selecting the name "John Jackson" on the interface 1700, and the interface 1700 responds by indicating that an email will thus be created for "John Jackson."

Figure 18:
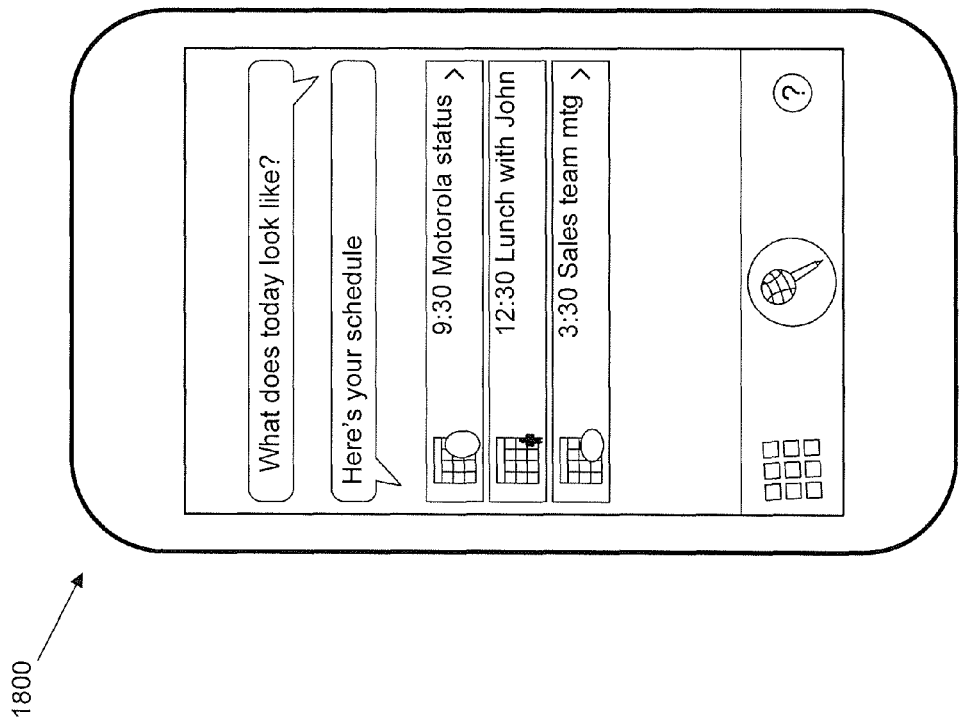
FIG. 18 illustrates a first example of a conversational context switching and related information interface in accordance with certain embodiments of the disclosed technology.

In certain embodiments, a query may allow for infinite "pivoting" in which the user may follow an entity within an entity and so on. FIG. 18 illustrates a first example of a conversational context switching and related information interface 1800 in accordance with certain embodiments of the disclosed technology. In the example, a user provides as input a query as to what his or her day look like, e.g., what events are on the user's calendar. Responsive to the query, a search is performed for relation information, events, tasks, etc. and the interface 1800 then provides the results of the search, in this case a listing of meetings on the user's calendar for that day. The results may be presented as aggregated/bucketed results or as suggested questions and may be provided by way of visual presentation, audible presentation, or combination thereof. In the example, the interface 1800 also includes a voice input button or icon (indicated by a microphone symbol) and a help button or icon (indicated by a question mark). In certain embodiments, either or both of these features may be activated by voice commands from the user.

Figure 19:
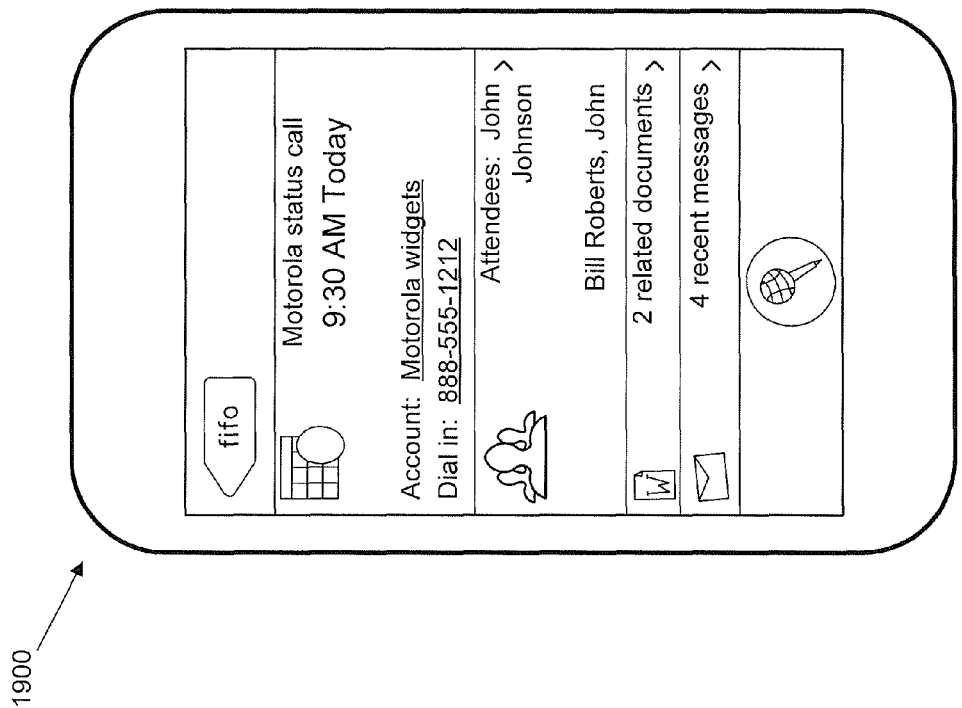
FIG. 19 illustrates a second example of a conversational context switching and related information interface in accordance with certain embodiments of the disclosed technology.

FIG. 19 illustrates a second example of a conversational context switching and related information interface 1900 in accordance with certain embodiments of the disclosed technology. This interface 1900 is an example of an interface resulting from a user selecting one of the meetings in the listing provided by the interface 1800 of FIG. 18, in this case the 9:30 "Motorola status" meeting. The interface 1900 can provide details about the selected meeting such as an indication as to who else is expected to attend the meeting. The interface 1900 can also provide a link to a listing of items that have some affiliation with the meeting. In the example, the interface 1900 provides a link to 2 related documents and 4 recent messages that each have some connection to the 9:30 "Motorola status" meeting. Also, like the interface 1800 of FIG. 18, the interface 1900 includes a voice input button or icon (indicated by a microphone symbol). In certain embodiments, this feature may be activated by voice commands from the user.

FIG. 20 illustrates a third example of a conversational context switching and related information interface 2000 in accordance with certain embodiments of the disclosed technology. This interface 2000 is an example of an interface resulting from a user selecting the voice input button in the interface 1900 of FIG. 19. In the example, the interface 2000 indicates that it is ready to receive the voice input by providing a "Listening . . . " indicator. The interface 2000 acknowledges receipt of the voice command by presenting it back to the user. Here, the user has provided a command for the other attendees of the selected meeting to be alerted that he or she is running late.

FIG. 21 illustrates a fourth example of a conversational context switching and related information interface 2100 in accordance with certain embodiments of the disclosed technology. This interface 2100 is an example of an interface resulting from receiving the voice input entered by way of the interface 2000 of FIG. 20. In the example, the interface 2100 acknowledges that, responsive to the user's command, a note will be sent to the other attendees of the meeting alerting them that the user is running late. The acknowledgement may be provided by way of visual presentation, audible presentation, or combination thereof.

Figure 22:
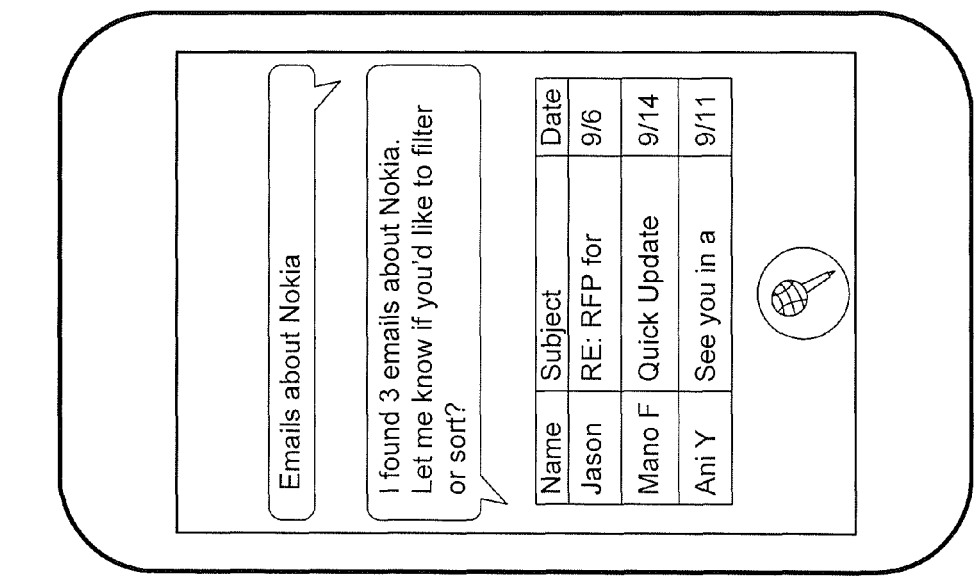
FIG. 22 illustrates a first example of a conversational follow-up interface in accordance with certain embodiments of the disclosed technology.

In certain situations, a user may wish to issue or have the system automatically issue one or more follow-up queries. FIG. 22 illustrates a first example of a conversational follow-up interface 2200 in accordance with certain embodiments of the disclosed technology. The interface 2200 includes a voice input button or icon (indicated by a microphone symbol). In certain embodiments, this feature may be activated by voice commands from the user. In the example, a user submits a query or command pertaining to emails concerning and/or associated with a certain company, here Nokia. For example, the user may select the voice input button or icon and then enter the query or command by voice. The system then conducts a search for potential matches and provides the results to the user.

The results may be provided by way of visual presentation, audible presentation, or combination thereof. The search may be conducted against any of a number of storage spaces including, but not limited to, the user's personal mail archive and the user's company's mail archive. In the example, three emails have been identified as a result of the search and are presented to the user. The interface 2200 indicates options available to the user with respect to the listed emails, in this case at least one filter option and at least one sort option.

Figure 23:
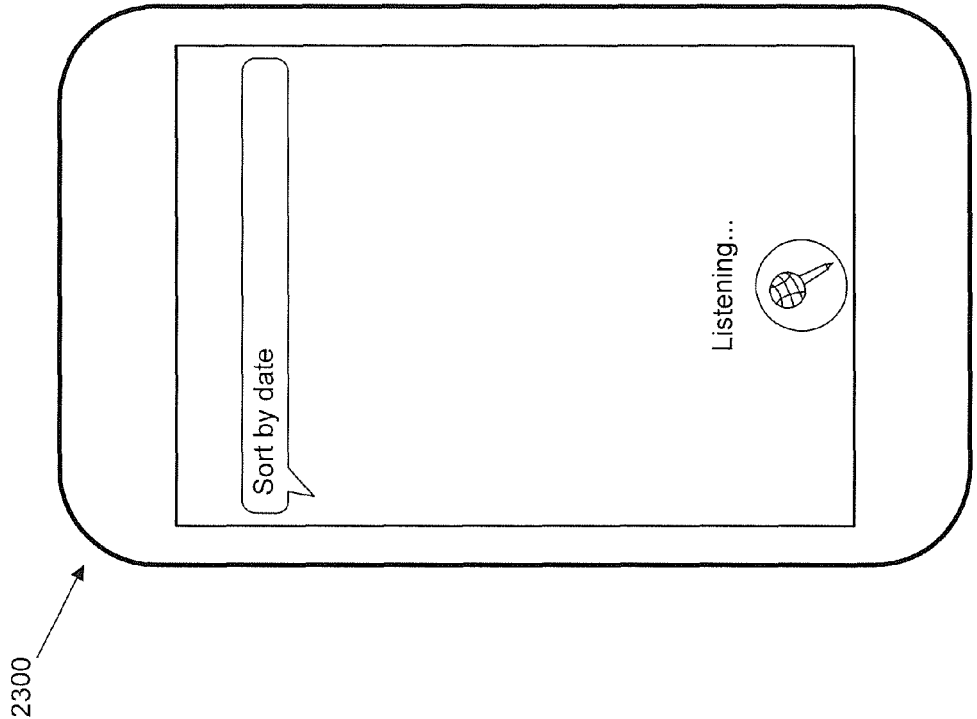
FIG. 23 illustrates a second example of a conversational follow-up interface in accordance with certain embodiments of the disclosed technology.

FIG. 23 illustrates a second example of a conversational follow-up interface 2300 in accordance with certain embodiments of the disclosed technology. This interface 2300 is an example of an interface resulting from a user selecting the voice input button in the interface 2200 of FIG. 22. In the example, the interface 2300 indicates that it is ready to receive a voice input by providing a "Listening . . . " indicator. The interface 2300 acknowledges receipt of the voice command by presenting it back to the user. Here, the user has provided a request that the listed emails by sorted by date. Alternatively or in addition thereto, the user may request other actions such as filtering or more (or less) searching.

Figure 24:
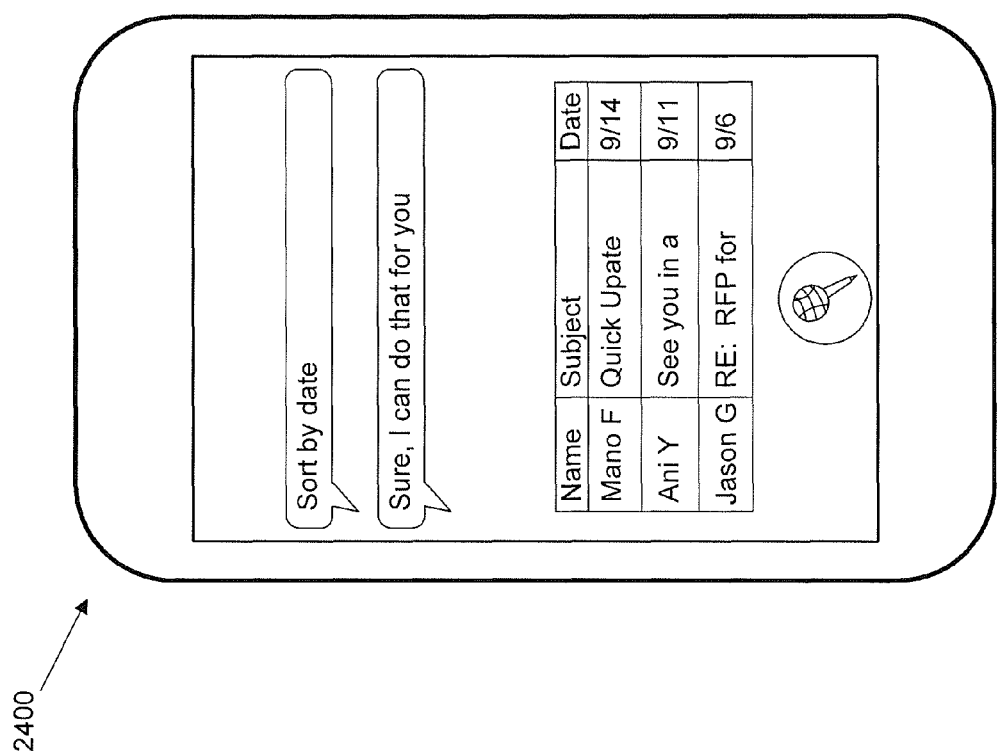
FIG. 24 illustrates a third example of a conversational follow-up interface in accordance with certain embodiments of the disclosed technology.

FIG. 24 illustrates a third example of a conversational follow-up interface 2400 in accordance with certain embodiments of the disclosed technology. This interface 2400 is an example of an interface resulting from receiving the voice input entered by way of the interface 2300 of FIG. 23. In the example, the interface 2400 acknowledges that, responsive to the user's command, the listed emails will be sorted by date and then proceeds to list the emails sorted by date. The acknowledgement may be provided by way of visual presentation, audible presentation, or combination thereof. Alternatively or in addition thereto, the user can request a filter operation such as issuing a command that only emails by "Mano" be listed, for example.

Figure 25:
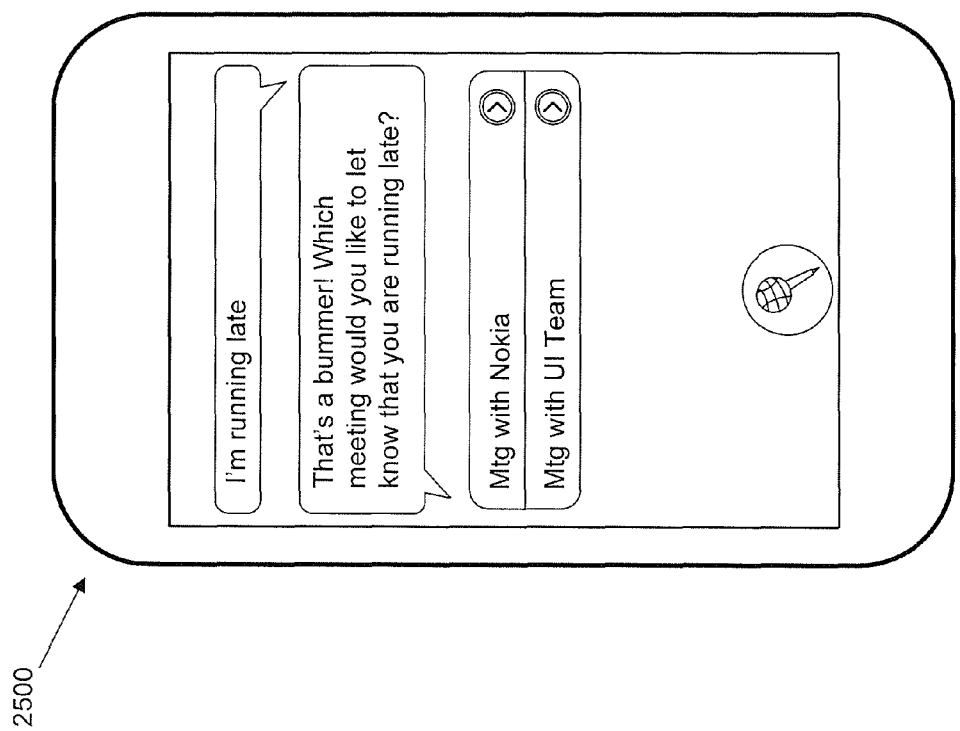
FIG. 25 illustrates a first example of a task workflow interface in accordance with certain embodiments of the disclosed technology.

In certain situations, a user may need to provide information pertaining to a workflow for a particular task. FIG. 25 illustrates a first example of a task workflow interface 2500 in accordance with certain embodiments of the disclosed technology. The interface 2500 includes a voice input button or icon (indicated by a microphone symbol). In certain embodiments, this feature may be activated by voice commands from the user. In the example, a user submits an input indicating that he or she is running late. For example, the user may select the voice input button or icon and then enter the input by voice. The system then conducts a search against the user's tasks, meetings, etc. for potential matches and provides the results to the user. The results may be provided by way of visual presentation, audible presentation, or combination thereof. In the example, two meetings have been identified as a result of the search and the interface 2500 provides them to the user.

Figure 26:
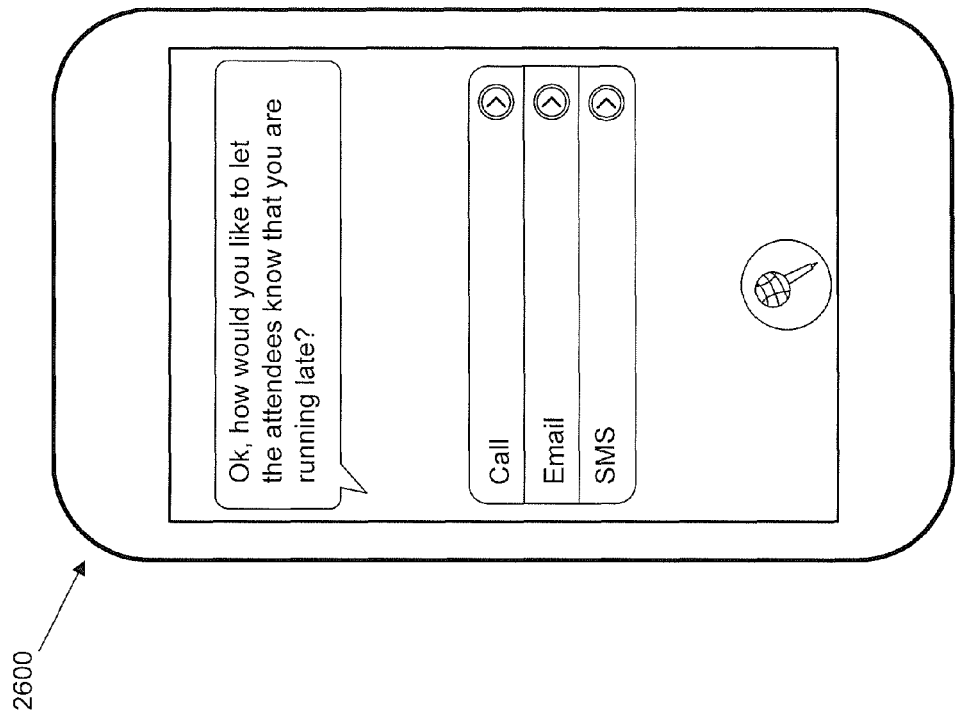
FIG. 26 illustrates a second example of a task workflow interface in accordance with certain embodiments of the disclosed technology.

FIG. 26 illustrates a second example of a task workflow interface 2600 in accordance with certain embodiments of the disclosed technology. This interface 2600 is an example of an interface resulting from the user selecting one of the meetings presented to him or her by the interface 2500 of FIG. 25. Like the interface 2500 of FIG. 25, the interface 2600 includes a voice input button or icon (indicated by a microphone symbol). In the example, the interface 2600 presents three options to the user: calling the other attendees, sending an email message to the other attendees, and/or sending an SMS message to the other attendees. The options may be provided by way of visual presentation, audible presentation, or combination thereof. The user may select one or more of the options presented to him or her by touch command or by voice command using the voice input button, for example.

Figure 27:
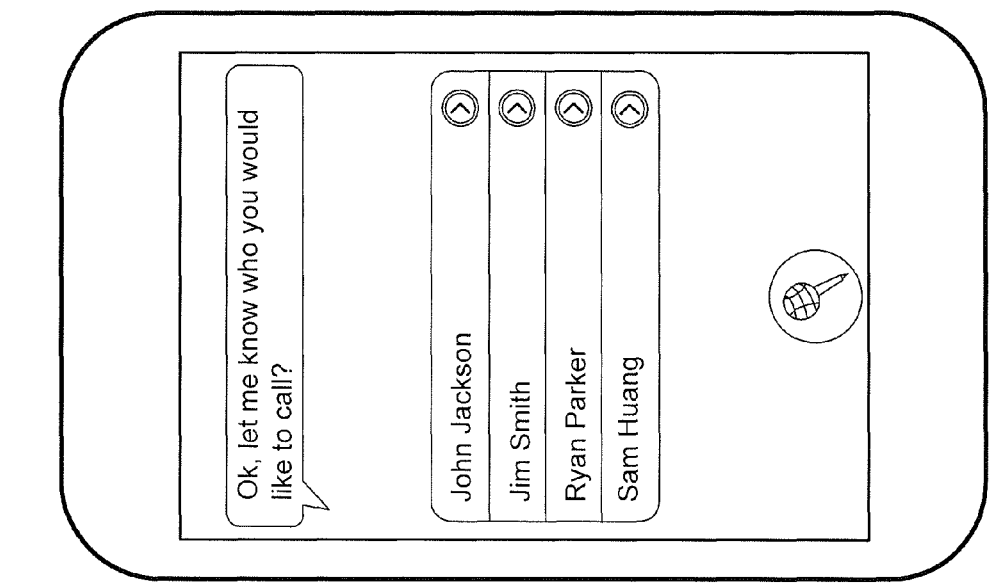
FIG. 27 illustrates a third example of a task workflow interface in accordance with certain embodiments of the disclosed technology.

FIG. 27 illustrates a third example of a task workflow interface 2700 in accordance with certain embodiments of the disclosed technology. This interface 2700 is an example of an interface resulting from the user selecting the "Call" option presented to him or her by the interface 2600 of FIG. 26. Responsive to the user selecting the "Call" option, a search is conducted and the interface 2700 presents a listing of the other attendees. The listing of attendees may be provided by way of visual presentation, audible presentation, or combination thereof.

Figure 28:
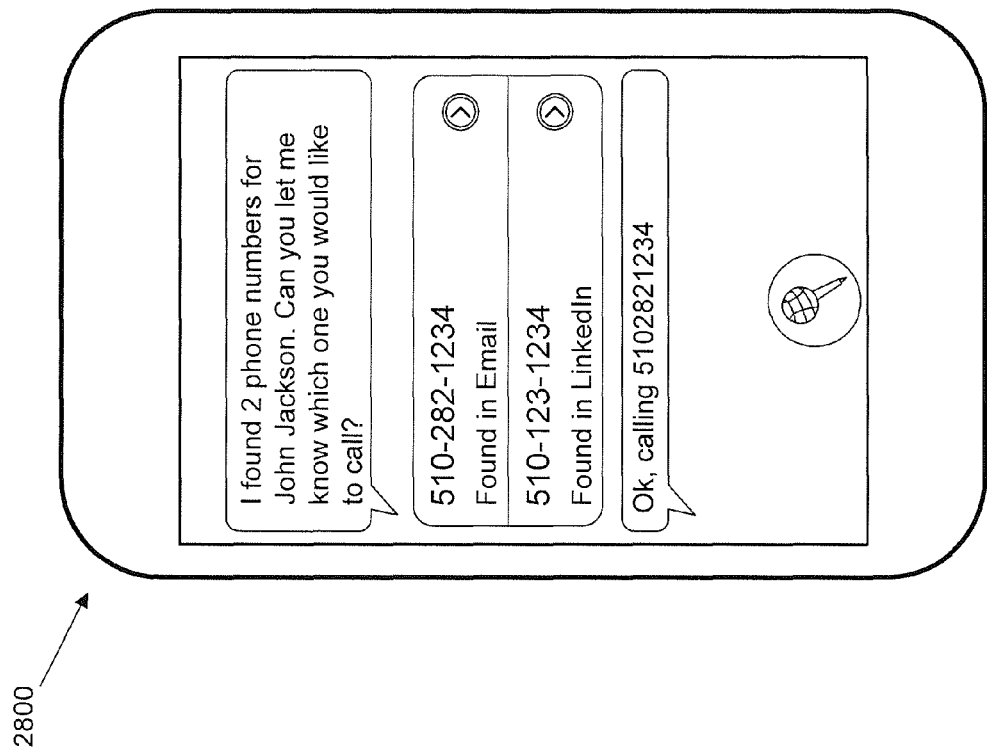
FIG. 28 illustrates a fourth example of a task workflow interface in accordance with certain embodiments of the disclosed technology.

FIG. 28 illustrates a fourth example of a task workflow interface 2800 in accordance with certain embodiments of the disclosed technology. This interface 2800 is an example of an interface resulting from the user selecting the user "John Jackson" in the listing presented to him or her by the interface 2700 of FIG. 27. Responsive to the selection of "John Jackson," a search is conducted and the interface 2700 presents the result(s) to the user. The result(s) may be provided by way of visual presentation, audible presentation, or combination thereof. Here, two phones numbers associated with "John Jackson" were retrieved. According, the interface 2700 presents both numbers, indicates the source from which each number was retrieved, and asks the user to select which number should be called. Responsive to the user selecting one of the phone numbers presented to him or her, the interface 2700 provides an indication that the selected number will be called.

Figure 29:
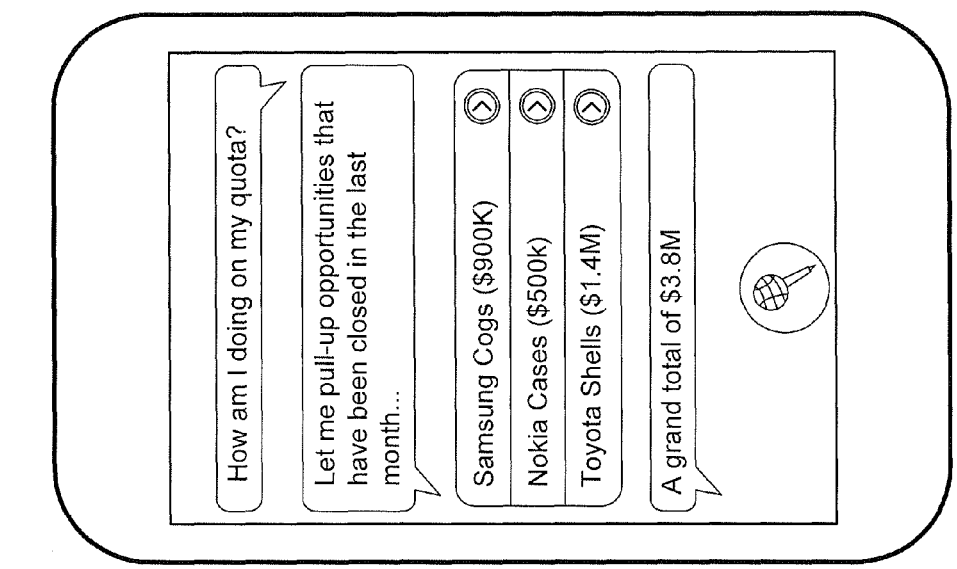
FIG. 29 illustrates a first example of a business intelligence interface in accordance with certain embodiments of the disclosed technology.

FIG. 29 illustrates a first example of a business intelligence interface 2900 in accordance with certain embodiments of the disclosed technology. The interface 2900 includes a voice input button or icon (indicated by a microphone symbol). In the example, a user submits a query as to how he or she is doing with his or her quota. For example, the user may select the voice input button or icon and then enter the query by voice. The system then conducts a search against the user's opportunities that have been closed for the last month for potential matches and provides the results to the user. The results may be provided by way of visual presentation, audible presentation, or combination thereof. In the example, three such opportunities have been identified and the interface 2900 provides them to the user. The interface 2900 may provide additional information and/or analysis pertaining to the results. Here, the interface 2900 provides a grand dollar amount total of the three listed opportunities. In certain embodiments, the results may be presented in the form of a graph, bar chart, pie chart, table, or other graphical representation.

Figure 30:
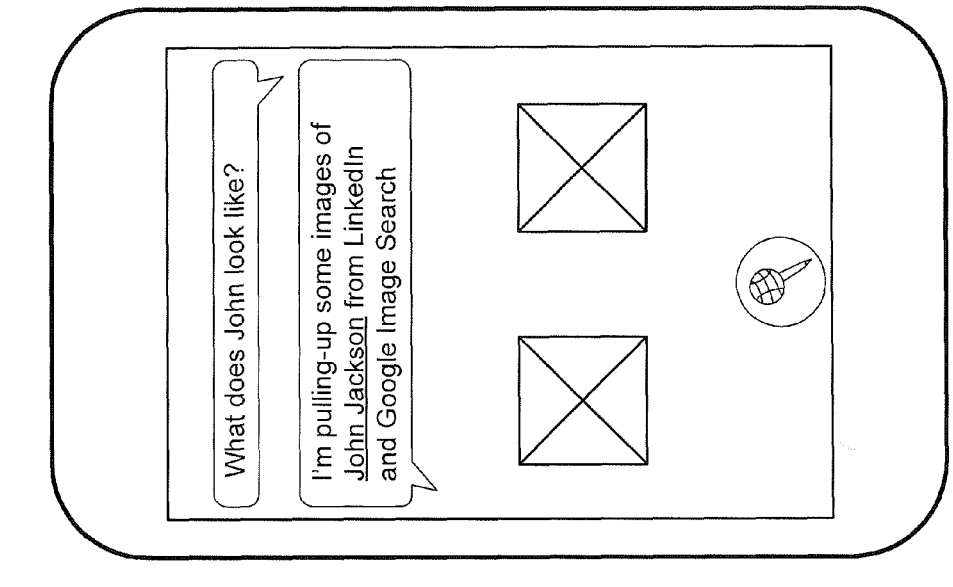
FIG. 30 illustrates a second example of a business intelligence interface in accordance with certain embodiments of the disclosed technology.

FIG. 30 illustrates a second example of a business intelligence interface 3000 in accordance with certain embodiments of the disclosed technology. Like the interface 2900 of FIG. 29, the interface 3000 includes a voice input button or icon (indicated by a microphone symbol). In certain embodiments, this feature may be activated by voice commands from the user. In the example, a user submits a query as to what an identified person, here "John," looks like. The user may select the voice input button or icon and then enter the query by voice, for example. The system then conducts a search against any of a number of different private and/or public data sources, such as LinkedIn and Google Image Search, for example, for potential matches and provides the results to the user. In the example, two potential matches have been identified and the interface 3000 provides them to the user. In certain embodiments, the potential matches may each include or be themselves links to the corresponding external location from which the image came. Should the user select the link, a transition message may be communicated to the user indicating that the transition is about to proceed, is proceeding, and/or has completed.

Figure 31:
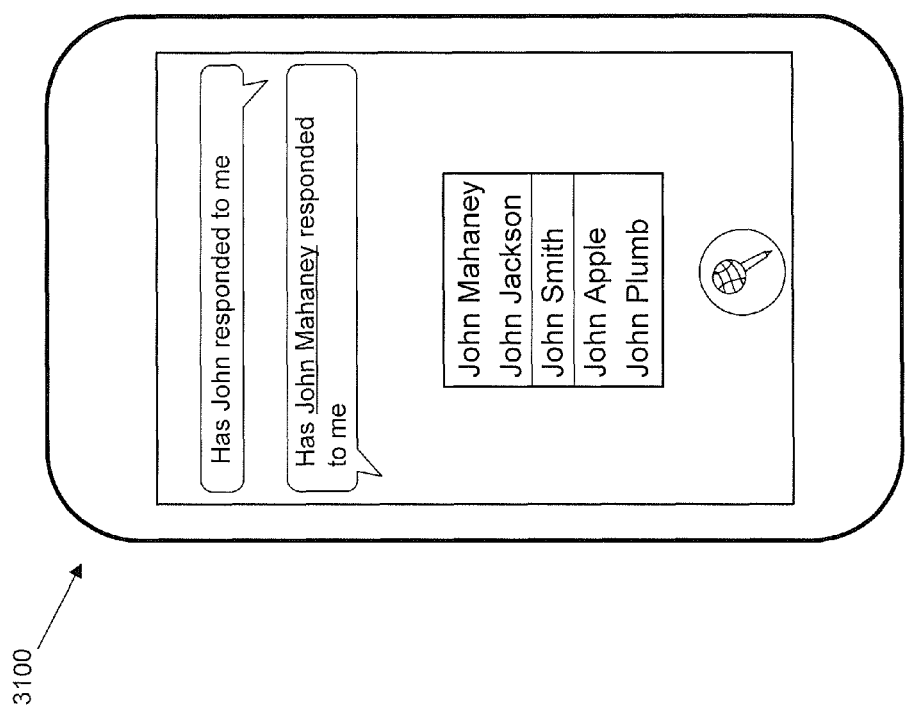
FIG. 31 illustrates an example of an underlined ambiguity interface in accordance with certain embodiments of the disclosed technology.

FIG. 31 illustrates an example of an underlined ambiguity interface 3100 in accordance with certain embodiments of the disclosed technology. The interface 3100 includes a voice input button or icon (indicated by a microphone symbol). In the example, a user submits a query as to whether an identified person, here "John," has responded to the user. The user may select the voice input button or icon and then enter the query by voice, for example. Responsive to a determination that there are multiple people named "John," the interface 3100 provides a listing of such identified people to the user. The listing may be provided to the user by way of visual presentation, audible presentation, or combination thereof.

In the example, the interface 3100 sorts the list based on how likely the person is the "John" in the user's query. The interface 3100 also replaces "John" in the original query with the top candidate in the listing, here "John Mahaney." The interface 3100 underlines "John Mahaney" to visually indicate to the user the replacement of "John" in the original query as well as the uncertainty related to the replacement. If the user is satisfied with the replacement, he or she can provide a command to proceed; otherwise, the user may interact with the interface 3100 to change "John Mahaney" to one of the other "Johns" in the listing or to a person that is not in the listing. In the case of the latter, the interface 3100 may provide further options to the user such as saving the entered "John" in the user's address book or other contact list.

In certain embodiments, a proof may be displayed along with an answer to a question presented by the user. For example, responsive to a user query "what is John's title at Nokia," the proof could be a signature extracted from an email thread or any of a number of documents demonstrating John's title at Nokia. Responsive to a user query "who can introduce me to John at Samsung," the answer could be "Ray" and the proof could be an email between Ray and John and a LinkedIn connection between Ray and John, for example. In certain embodiments, the proof may be presented as a natural language sentence such as "Ray could introduce you to John at Samsung because Ray used to work with John at Samsung," for example. In alternative embodiments, the proof may be presented as a formula, such as the response to the query "How am I doing on my quota" in connect with FIG. 29, discussed above.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, communications devices such as cellular phones and smart phones, and the like. These machines may be implemented as part of a cloud computing arrangement.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits (ASICs), embedded computers, smart cards, and the like. The machine can be controlled, at least in part, by input from conventional input devices, e.g., keyboards, touch screens, mice, and audio devices such as a microphone, as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible and non-transitory physical storage media. Certain outputs may be in any of a number of different output types such as audio or text-to-speech, for example.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A machine-implemented method for supporting a natural language user request against a user's personal data cloud, the method comprising:
   a machine extracting personal textual data identifying names, locations, and/or contact information for persons and places from electronic mail (email) messages, contact data, or calendar data stored on different network sources in the user's personal data cloud;

the machine constructing a semantically-indexed integrated knowledge store for storage and future retrieval of the personal textual data;

the machine extracting additional information from other network sources;

the machine correlating the additional information from the other network sources with the previously stored personal textual data and generating additional personal textual data for the semantically-indexed integrated knowledge store identifying additional names, locations, and/or contact information for the persons and places;

the machine receiving the natural language user request from the user;

the machine determining a semantic interpretation of the natural language user request, wherein determining the semantic interpretation comprises referencing a stored ontology that defines a semantic relationship among a set of personal data terminology;

the machine querying the semantically-indexed integrated knowledge store based at least in part on the semantic interpretation; and the machine responding to the natural language user request by displaying one or more results of the querying, wherein the one or more results include at least some of the names, locations, and/or contact information identified by the semantically-indexed integrated knowledge store;

the machine displaying a suggestions panel based on the semantically-indexed integrated knowledge store offering refinements for types of personal textual data available responsive to the natural language user request; and the machine querying the semantically-indexed integrated knowledge store based on selected ones of the refinements.

2. The machine-implemented method of claim 1, wherein the personal textual data includes user data from calendar events, shared documents.

3. The machine-implemented method of claim 1, wherein the network sources comprise network-based user accounts associated with, social networks, file sharing, and customer relationship management CRM.

4. The machine-implemented method of claim 1, wherein constructing the semantically-indexed integrated knowledge store comprises an automated semantic analysis of the personal textual data.

5. The machine-implemented method of claim 4, wherein the automated semantic analysis of the personal textual data comprises one or both of automatic clustering and tagging operations.

6. The machine-implemented method of claim 1, wherein the natural language user request includes a natural language query, a natural language command, or both.

7. The machine-implemented method of claim 1, further comprising:
the machine displaying a list of calendar items in response to the natural language user request;
the machine querying the semantically-indexed integrated knowledge store for attendees, documents, and messages associated with a selected one of the calendar items; and
the machine displaying the attendees, documents, and messages.

8. The machine-implemented method of claim 1, further comprising receiving and responding to a non-natural language user request received from the user.

9. The machine-implemented method of claim 1, further comprising refining the stored ontology over time based at least in part on machine learning.

10. The machine-implemented method of claim 1, further comprising refining the stored ontology over time based at least in part on interactive user feedback, wherein the interactive user feedback comprises at least one from a group consisting of: a star rating mechanism, a thumbs-up or thumbs-down mechanism, and a numbered scale mechanism.

11. The machine-implemented method of claim 1, wherein the network sources in the user's personal data cloud correspond to more than one user account, and wherein at least one of the more than one user account corresponds to a different cloud service than a different account of the more than one user account.

12. A system, comprising:
a storage device; and
a processor configured to operate a machine-implemented data extractor and correlator configured to:
extract personal data from a first heterogeneous group of network sources, wherein at least one of the network sources of the first heterogeneous group corresponds to a different user account than another one of the network sources of the first heterogeneous group, the personal data including names, locations, and/or contact information associated persons and places;
construct a semantically-indexed knowledge store in the storage device for future retrieval of the personal data associated with the persons and places;
extract additional information from documents in a second group of network sources that is different than the first heterogeneous group of network sources, wherein the second group of network sources includes at least one network source and each one of said at least one network source is different than each network source of the first heterogeneous group of network sources, the additional information extracted from one(s) of the network sources of the second group that are associated with the persons and places;
correlate the additional information with the semantically-indexed knowledge store to identify additional names, locations, and/or contact information associated with the persons and places;
store the additional information as part of the personal data associated with the persons and places;
receive a natural language user request from a user;
determine a semantic interpretation of the natural language user request by reference to a stored ontology that defines a semantic relationship among a set of personal data terminology;
query the semantically-indexed integrated knowledge store based on the semantic interpretation of the natural language user request to identify results including at least some of the names, locations, and/or contact information associated with the persons or places;
display a suggestions panel based on the semantically-indexed integrated knowledge store to offer refinements for types of personal textual data available responsive to the natural language request; and
if a selection from the refinements is received from a user, query the semantically-indexed integrated knowledge store based on the selection.

13. The system of claim 12, wherein the data extractor and correlator is further configured to present a ranked list of alternative potential responses to the natural language user request.

14. The system of claim 13, the data extractor and correlator is further configured to refine the ranked list based on one or more additional user inputs solicited from the user.

15. The system of claim 12, wherein the data extractor and correlator is further configured to determine a ranked list of online documents containing a probable answer responsive to the natural language user request.

16. The system of claim 12, wherein the data extractor and correlator is further configured to determine at least one probable answer responsive to the natural language user request, and present to the user the at least one probable answer.

17. The system of claim 12, wherein the data extractor and correlator is further configured to invoke one or more of a plurality of network services to perform a desired action responsive to the natural language user request.

18. The system of claim 17, wherein the plurality of network services comprises an alert creation mechanism configured to create an alert, and wherein the desired action comprises creation of the alert.

19. The system of claim 17, wherein the plurality of network services comprises a reminder creation mechanism configured to create a reminder, and wherein the desired action comprises creation of the reminder.

20. The system of claim 12, wherein the data extractor and correlator is further configured to integrate the results with one or more additional results obtained by querying one or more network information sources that are external to the knowledge store, each of said one or more network information sources different than each network source of the first heterogeneous group.

21. The system of claim 20, wherein the one or more external network information sources comprise a geographic positioning system (GPS) source, and wherein the one or more additional results comprises a geographic location corresponding to at least one of the results.

22. The system of claim 12, wherein the natural language user request is received by way of a voice command from the user.

23. The system of claim 12, wherein the data extractor and correlator is further configured to present suggested actions to the user responsive to the user activating a help feature.

24. The system of claim 12, wherein the data extractor and correlator is further configured to sort the results responsive to a command from the user.

25. The system of claim 12, wherein the extractor and correlator is further configured to filter the results responsive to a command from the user.

26. The system of claim 12, wherein the extractor and correlator is further configured to disambiguate the natural language user request.

27. The system of claim 26, wherein the disambiguating comprises presenting at least one element of the natural language user request in a manner distinct from the remainder of the natural language user request.

28. The system of claim 12, wherein the extractor and correlator is to receive a user edit of the natural language user request.

29. The system of claim 12, wherein the results include a link to an external website.

30. The system of claim 12, wherein the data extractor and correlator is further configured to receive a follow-up query from the user.

31. The system of claim 12, wherein the extractor and correlator is further configured to receive a phone number responsive to the user selecting the results.

32. The system of claim 12, wherein the results include at least one image corresponding to at least one other user.

33. The system of claim 12, wherein the second group of network sources includes at least one public network source, and wherein the data extractor and correlator is further configured to store information derived algorithmically from structured and/or unstructured data from the at least one public network source of the second group of network sources.

34. The system of claim 33, wherein the results correspond to at least one item within the at least one public network source.

* * * * *